(12) United States Patent
Kawamoto et al.

(10) Patent No.: US 10,763,714 B2
(45) Date of Patent: Sep. 1, 2020

(54) MOTOR

(71) Applicant: NIDEC CORPORATION, Minami-ku, Kyoto (JP)

(72) Inventors: Tatsuro Kawamoto, Minami-ku Kyoto (JP); Takayuki Migita, Minami-ku Kyoto (JP); Takao Atarashi, Minami-ku Kyoto (JP); Yasuaki Nakahara, Minami-ku Kyoto (JP)

(73) Assignee: NIDEC CORPORATION, Kyoto (JP)

(*) Notice: Subject to any disclaimer, the term of this patent is extended or adjusted under 35 U.S.C. 154(b) by 184 days.

(21) Appl. No.: 15/944,872

(22) Filed: Apr. 4, 2018

(65) Prior Publication Data
US 2018/0226851 A1 Aug. 9, 2018

Related U.S. Application Data

(63) Continuation of application No. 15/052,285, filed on Feb. 24, 2016, now Pat. No. 9,973,048.

(30) Foreign Application Priority Data

Feb. 27, 2015 (JP) ................................ 2015-039134

(51) Int. Cl.
*H02K 1/27* (2006.01)
*H02K 15/03* (2006.01)

(52) U.S. Cl.
CPC .......... *H02K 1/2773* (2013.01); *H02K 1/272* (2013.01); *H02K 1/274* (2013.01); *H02K 15/03* (2013.01); *H02K 2213/03* (2013.01)

(58) Field of Classification Search
CPC ...... H02K 1/2773; H02K 1/272; H02K 1/274; H02K 15/03; H02K 2213/03
(Continued)

(56) References Cited

U.S. PATENT DOCUMENTS 3,979,821 A 9/1976 Noodleman
4,260,921 A 4/1981 Silver
(Continued)

FOREIGN PATENT DOCUMENTS

CN 102957237 A 3/2013
DE 102010030326 A1 12/2011
(Continued)

OTHER PUBLICATIONS

Kawamoto et al.;"Motor";U.S. Appl. No. 15/052,285, filed Feb. 24, 2016.
(Continued)

*Primary Examiner* — Burton S Mullins
(74) *Attorney, Agent, or Firm* — Cantor Colburn LLP

(57) ABSTRACT

A motor may include a rotor including a shaft; a stator; and a bearing supporting the shaft. The rotor may include a plurality of core pieces on an outer side of the shaft, a plurality of permanent magnets, a mold resin part between the core pieces, and an interposed part in contact with a surface on one side in a circumferential direction of each of the core pieces. The neighboring core pieces may include a magnet insertion hole provided therebetween. The permanent magnet may include two poles, with poles of neighboring magnets facing each other having identical polarity. Each of the permanent magnets is in indirect contact with the core piece positioned on the other side in the circumferential direction of the magnet insertion hole via the interposed part.

68 Claims, 13 Drawing Sheets

(58) Field of Classification Search
USPC .......................................................... 310/156
See application file for complete search history.

(56) References Cited

U.S. PATENT DOCUMENTS

| | | |
|---|---|---|
| 4,354,126 A | 10/1982 | Yates |
| 4,504,755 A | 3/1985 | Semones et al. |
| 5,452,590 A | 9/1995 | Vigili |
| 6,794,784 B2 | 9/2004 | Takahashi et al. |
| 7,205,695 B2 | 4/2007 | Smith |
| 7,205,698 B2 | 4/2007 | Smith |
| 7,612,480 B2 | 11/2009 | Fujii et al. |
| 8,729,767 B2 | 5/2014 | Feuerrohr et al. |
| 9,178,394 B2 | 11/2015 | Asahi et al. |
| 9,343,934 B2 | 5/2016 | Zhao et al. |
| 9,419,482 B2 | 8/2016 | Lee et al. |
| 2004/0212266 A1 | 10/2004 | Hans |
| 2008/0024018 A1 | 1/2008 | Rignault et al. |
| 2011/0121668 A1 | 5/2011 | Condamin et al. |
| 2012/0038237 A1 | 2/2012 | Li et al. |
| 2013/0049493 A1* | 2/2013 | Zhao .................. H02K 1/2773 310/43 |
| 2013/0057103 A1 | 3/2013 | Han et al. |
| 2013/0187486 A1 | 7/2013 | Lee et al. |
| 2013/0207507 A1 | 8/2013 | Han et al. |
| 2013/0241324 A1 | 9/2013 | Mader et al. |
| 2014/0042854 A1* | 2/2014 | Asahi .................. H02K 1/2706 310/156.08 |
| 2014/0103768 A1* | 4/2014 | Brahmavar ............ H02K 21/16 310/156.08 |
| 2014/0300243 A1 | 10/2014 | Berkouk et al. |
| 2014/0306569 A1 | 10/2014 | Kojima et al. |

FOREIGN PATENT DOCUMENTS

| | | |
|---|---|---|
| JP | S6370275 U | 5/1988 |
| JP | 04068449 U1 | 6/1992 |
| JP | 7312852 A | 11/1995 |
| JP | 2000175388 A | 6/2000 |
| JP | 2007174822 A | 7/2007 |
| JP | 2011524735 A | 9/2011 |
| JP | 2013051796 A | 3/2013 |
| JP | 5212680 B2 | 6/2013 |
| JP | 2013219931 A | 10/2013 |
| JP | 2013219948 A | 10/2013 |
| JP | 2014036457 A | 2/2014 |
| KR | 1019980069557 P | 10/1998 |
| KR | 20130027417 A | 3/2013 |
| KR | 20130085337 A | 7/2013 |
| WO | 2008078584 A1 | 7/2008 |
| WO | 2011160872 A3 | 12/2011 |

OTHER PUBLICATIONS

USPTO Non-Final Office Action corresponding to U.S. Appl. No. 15/054,687; dated Nov. 9, 2017.

U.S. Notice of Allowance corresponding to related U.S. Appl. No. 15/052,285; dated Jan. 8, 2018.

U.S. Final Office Action corresponding to related U.S. Appl. No. 15/054,687; dated Mar. 26, 2018.

* cited by examiner

MOTOR

CROSS REFERENCE TO RELATED APPLICATION

The present application is a continuation application of U.S. patent application Ser. No. 15/052,285, filed on Feb. 24, 2016, the entire contents of which are incorporated herein by reference and priority to which is hereby claimed. The present invention claims priority under 35 U.S.C. § 119 to Japanese Application No. 2015-039134 filed Feb. 27, 2015, the entire content of which is incorporated herein by reference.

FIELD OF THE INVENTION

The present disclosure relates to a motor.

BACKGROUND

For example, Japanese Patent Application Publication No. H07-312852 discloses a permanent magnet type rotor, which is an integrated unit of a permanent magnet, a yolk part, and a shaft, formed by resin molding.

In the permanent magnet type rotor described above, there has been a risk of demagnetization when the integrated unit is formed by resin molding, due to the heat of the resin. In order to overcome such risk, disposing the permanent magnet between the yolk part after the yolk part (core piece part) is formed into an integrated unit by resin molding can be considered. When such method is employed, the permanent magnet is attached to either side of the neighboring yolk parts by using magnetic force.

However, it is difficult to intentionally attach a permanent magnet, which is disposed between the yolk part, to one side of the neighboring yolk part in a circumferential direction. For this reason, the location of the permanent magnet in the yolk part may vary per each permanent magnet, and the location of the permanent magnet in the circumferential direction may become irregular. Consequently, the magnetic flux generated by the permanent magnet becomes uneven, and further, the center of gravity balance in the circumferential direction of the permanent magnet type rotor becomes deteriorated. As a result, the rotation of the permanent magnet type rotor becomes unstable, and vibration and noise have been generated when the permanent magnet type rotor rotates.

SUMMARY

One example of the present disclosure is a motor comprising a rotor which has a shaft having its center on a vertically extended center axis, a stator which is disposed at a radially outer side of the rotor, and a bearing which supports the shaft, the rotor having a plurality of core pieces arranged on a radially outer side of the shaft in a circumferential direction, a plurality of permanent magnets to magnetize the core piece part, a mold resin part made of resin and disposed between the plurality of core pieces, and an interposed part in contact with a surface on one side in a circumferential direction of each of the core pieces, the neighboring core pieces having a magnet insertion hole provided therebetween in a circumferential direction, extended in an axial direction for insertion of the permanent magnet, the permanent magnet having two magnetic poles arranged along a circumferential direction, the magnetic poles of the circumferentially neighboring permanent magnets facing each other having identical polarity, in which each of the permanent magnets is in indirect contact with the core piece positioned on the other side in the circumferential direction of the magnet insertion hole via the interposed part.

According to one example of the present disclosure, it is possible to inhibit the vibration and the noise caused by the rotation of the rotor.

The above and other elements, features, steps, characteristics and advantages will become more apparent from the following detailed description of the embodiments with reference to the attached drawings.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Herein, a motor according to an exemplary embodiment of the present disclosure will be described with reference to the drawings. The scope of the present disclosure is not limited to the below embodiment, and can be appropriately altered within the scope of technical idea of the present disclosure. The following drawings may have vast difference in the dimension of each structure from the actual structure, in order to clearly illustrate each constitution.

Figure 1:
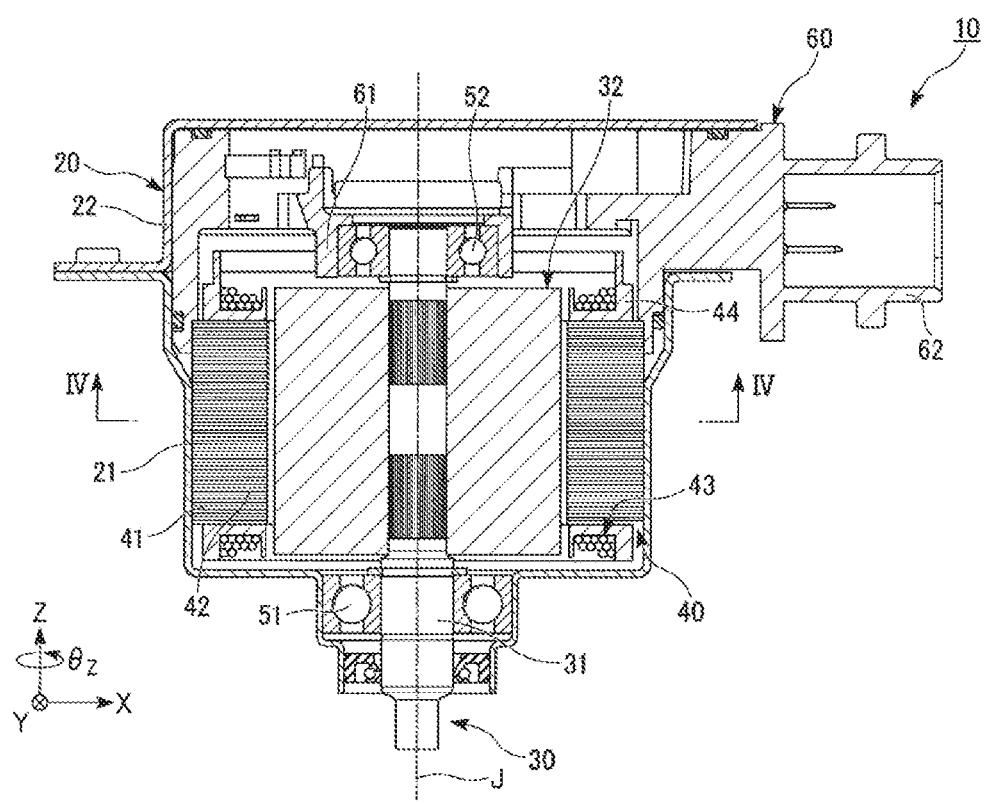
FIG. 1 is a cross-sectional view of a motor of a first exemplary embodiment.

In the drawings, an X-Y-Z coordinate system is provided as an appropriate 3-dimensional orthogonal coordinates system. In the X-Y-Z coordinate system, a direction parallel to the axial direction of the center axis J1 shown in FIG. 1 is referred to as the z-axis direction. A direction perpendicular to the z-axis direction, that is, the left and right directions of FIG. 1, is referred to as the x-axis direction. A direction perpendicular to both the x-axis direction and the z-axis direction is referred to as the y-axis direction. Also, a circumferential direction having its center on the center axis J is referred to as the θZ direction. As to the θZ direction, a clockwise direction when viewed toward the +Z side from the −Z side is referred to as the positive direction, and a counter clockwise direction when viewed toward the +Z side from the −Z side is referred to as the negative direction.

Herein, a direction extended from the center axis J (z-axis direction) is referred to as the vertical direction. The positive side of the z-axis direction (+Z side) is referred to as the "upper side (axial upper side)", and the negative side of the z-axis direction (−Z side) is referred to as the "lower side". It is to be understood that the descriptions of the vertical direction, upper side and the lower side are used for explanation only, and they do not limit the actual positional relation or direction. Also, unless otherwise explained, a direction parallel to the center axis J (z-axis direction) is simply referred to as the "axial direction", a radial direction having its center on the center axis J is simply referred to as the "radial direction", and a circumferential direction having its center on the center axis J (θZ direction), that is, the axial circumference of center axis J, is simply referred to as the "circumferential direction".

Further, a direction along the positive direction of the θZ direction (+θZ side, one circumferential direction) is referred to as the "driving side", and the direction along the negative direction of the θZ direction (−θZ side, other circumferential direction) is referred to as the "counter driving side". Also, the descriptions of the driving side and counter driving side are used for explanation only, and they do not limit the actual driving direction.

In the present description, being axially extended refers to a strict meaning of being extended in an axial direction (z-axis direction), but it may also include the meaning of being extended in an axial direction inclined within a range of 45° or less. Also in the present description, being radially extended refers to a strict meaning of being extended in a radial direction, that is, a direction perpendicular to the axial direction (z-axis direction), but in may also include the meaning of being extended in a radial direction inclined within a range of 45° or less.

First Embodiment

FIG. 1 is a cross-sectional view of a motor 10 of the present embodiment. As shown in FIG. 1, the motor 10 comprises a housing 20, a rotor 30 having a shaft 31, a stator 40, a lower bearing 51, an upper bearing 52, and a bus bar unit 60.

The housing 20 is a casing having a cylindrical portion. The housing 20 receives the rotor 30, the stator 40, the lower bearing 51, the upper bearing 52, and the bus bar unit 60. The housing 20 has a lower housing 21, and an upper housing 22. The lower housing 21 has a cylindrical shape which is open on both sides in the axial direction (±Z side). The upper housing 22 is coupled to an end portion of the upper side (+Z side) of the lower housing 21. The upper housing 22 covers the rotor 30 and upper side of the stator 40.

The stator 40 is retained on the inside of the lower housing 21. The stator 40 is disposed at a radially outer side of the rotor 30. The stator 40 has a core back part 41, a teeth part 42, a coil 43, and a bobbin 44. The core back part 41 has, for example, a cylindrical shape concentric with the center axis J. The outer surface of the core back part 41 is coupled to the inner surface of the lower housing 21.

The teeth part 42 is extend from the inner surface of the core back part 41 toward the shaft 31. Although it is omitted from the drawings, a plurality of teeth parts 42 are provided, and arranged at equal spaces in the circumferential direction.

The bobbin 44 is mounted on each teeth part 42. The coil 43 is wound around each teeth part 42 via the bobbin 44. In this embodiment, the core back part 41 and the teeth part 42 are made of a laminated steel plate which is formed by laminating a plurality of electromagnetic steel plates.

The bus bar unit 60 is disposed at an upper side (+Z side) of the stator 40. The bus bar unit 60 has a connector part 62. An outer power source, which is omitted from the drawings, is connected to the connector part 62. The bus bar unit 60 has a wiring member which is electrically connected with the coil 43 of the stator 40. One end of the wiring member is exposed to the exterior of the motor 10 via the connector part 62. Accordingly, power is supplied from the outer power source to the coil 43 through the wiring member. The bus bar unit 60 has a bearing support part 61.

The lower bearing 51 and the upper bearing 52 support the shaft 31. The lower bearing 51 is disposed at a lower side (−Z side) than the stator 40. The lower bearing 51 is retained in the lower housing 21. The upper bearing 52 is disposed at an upper side (+Z side) than the stator 40. The upper bearing 52 is retained in the bearing support part 61 of the bus bar unit 60.

The rotor 30 has a shaft 31, and a rotor body unit 32. The shaft 31 has its center on the center axis J which extends in the vertical direction (z-axis direction). In this embodiment, the shaft is a member having a cylindrical shape. The shaft may be a solid type member or a hollow type cylindrical member. The rotor body unit 32 is disposed at a radially outer side of the shaft 31. The rotor body unit 32 is coupled to an outer circumferential surface of the shaft 31. The rotor 30 rotates, for example, in a counter clockwise direction on the center axis J when viewed from the upper side (+Z side), that is, from a counter driving side (−θZ side) to the driving side (+θZ side).

Figure 2:
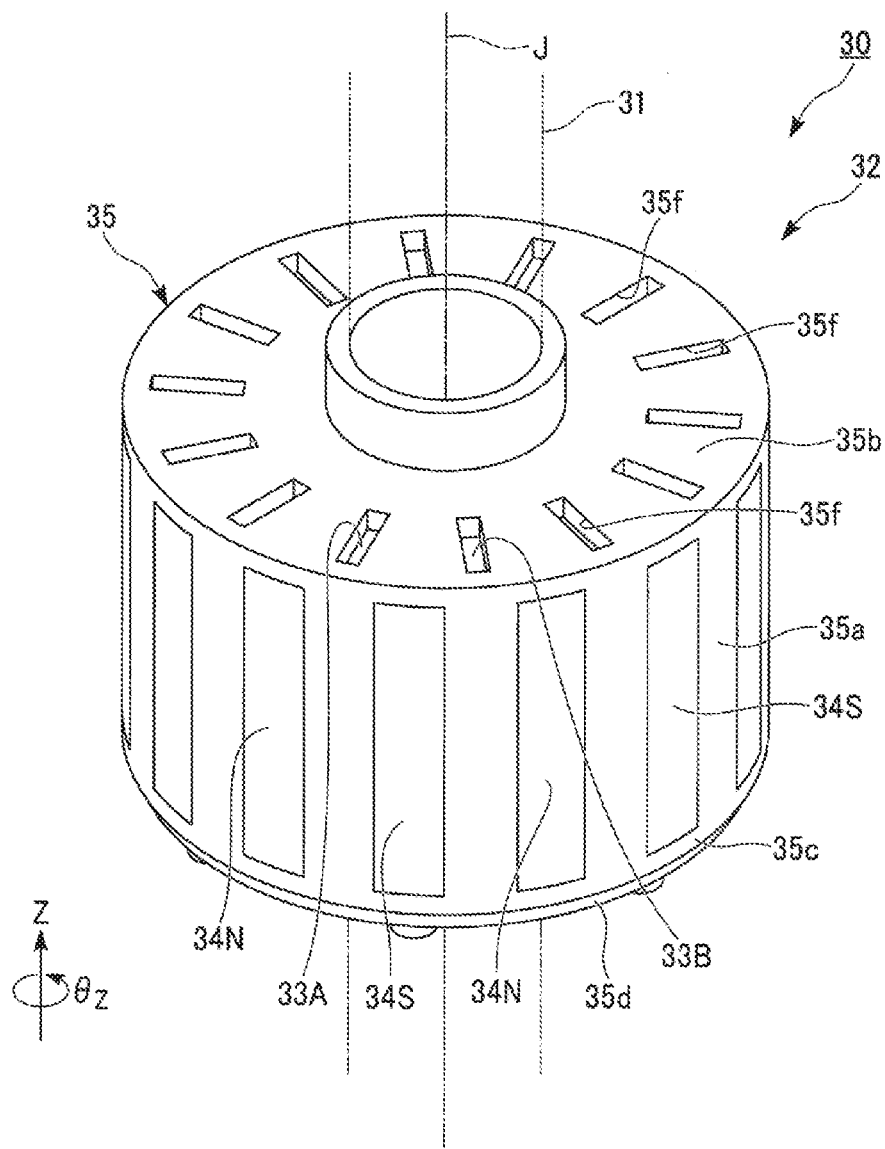
FIG. 2 is a perspective view of the motor or the first exemplary embodiment.
Figure 3:
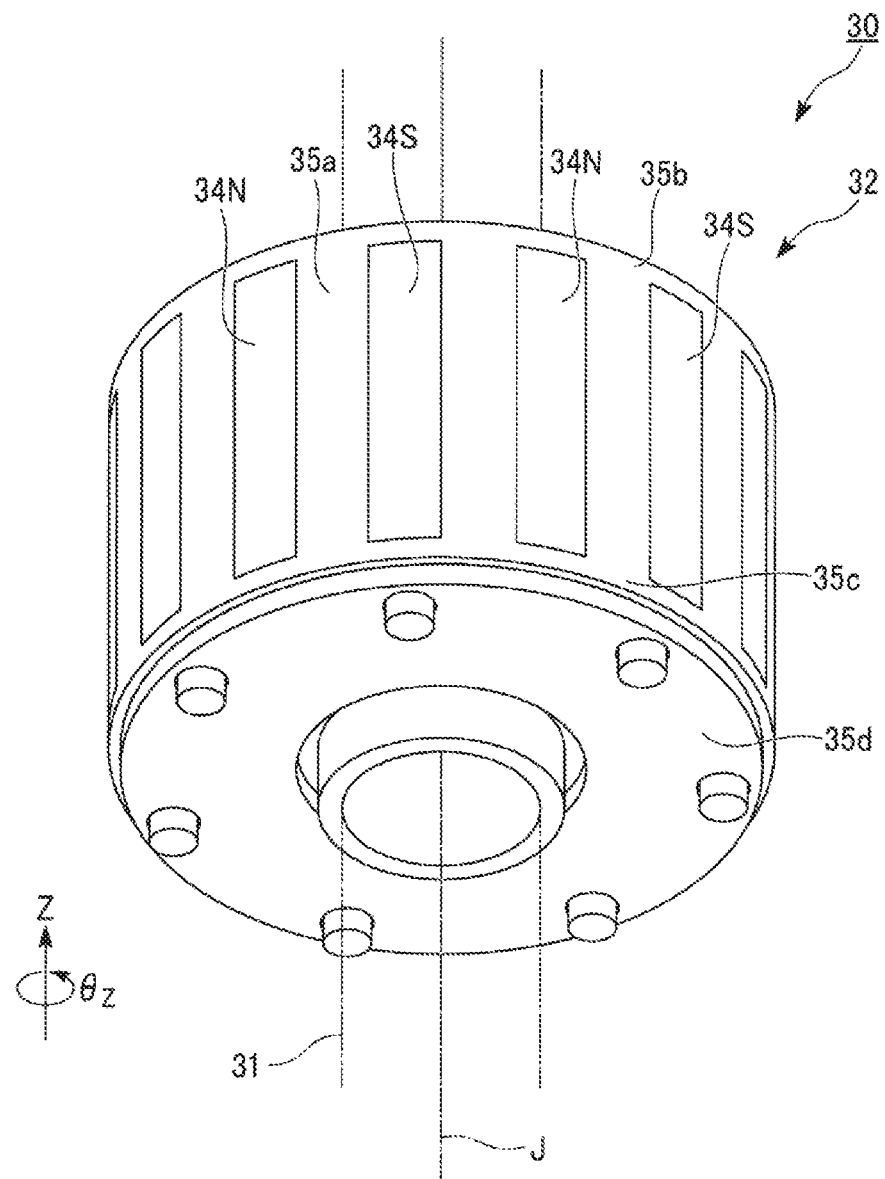
FIG. 3 is a perspective view of a rotor of the first exemplary embodiment.
Figure 4:
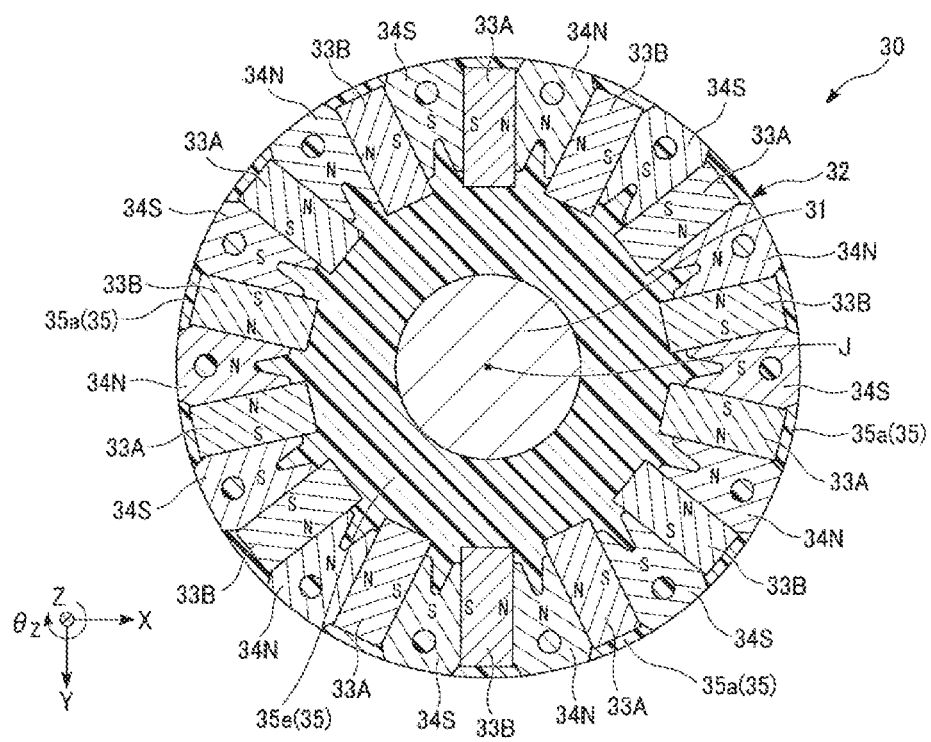
FIG. 4 is a cross-sectional view of the rotor of the first exemplary embodiment, and shows a cross section of IV-IV from FIG. 1.
Figure 5:
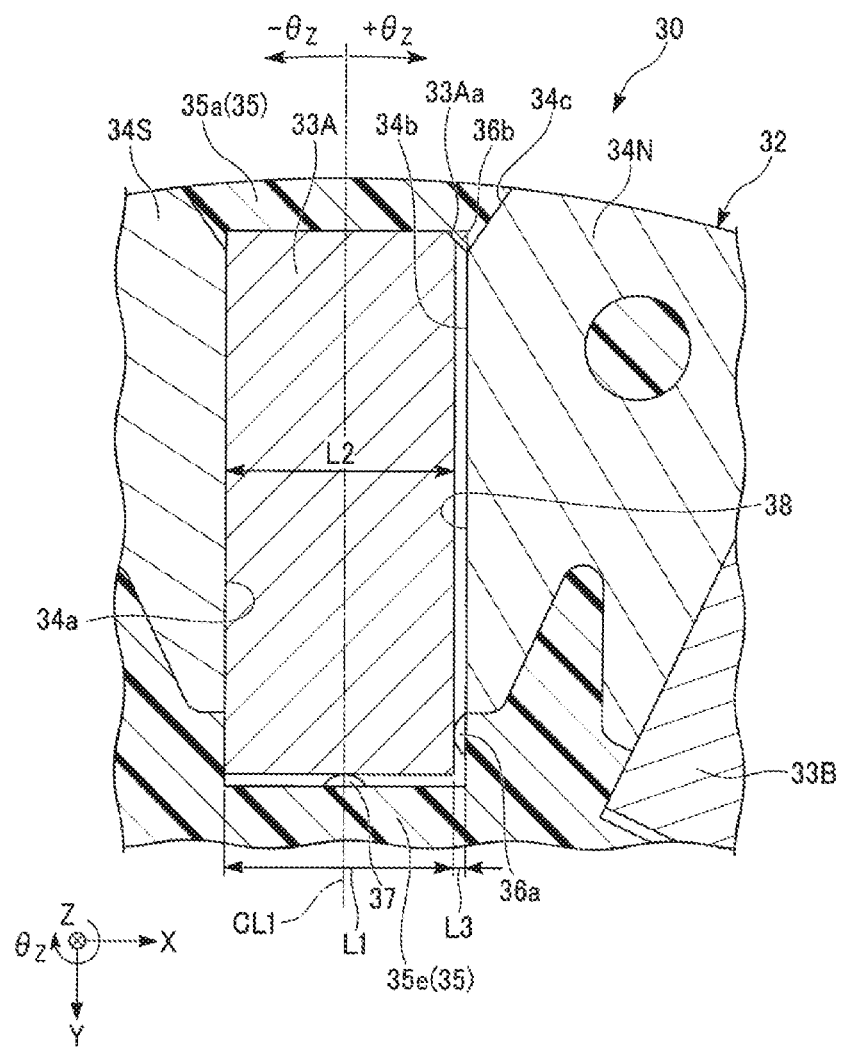
FIG. 5 illustrates the rotor of the first exemplary embodiment, and is a partially enlarged view of FIG. 4.
Figure 6:
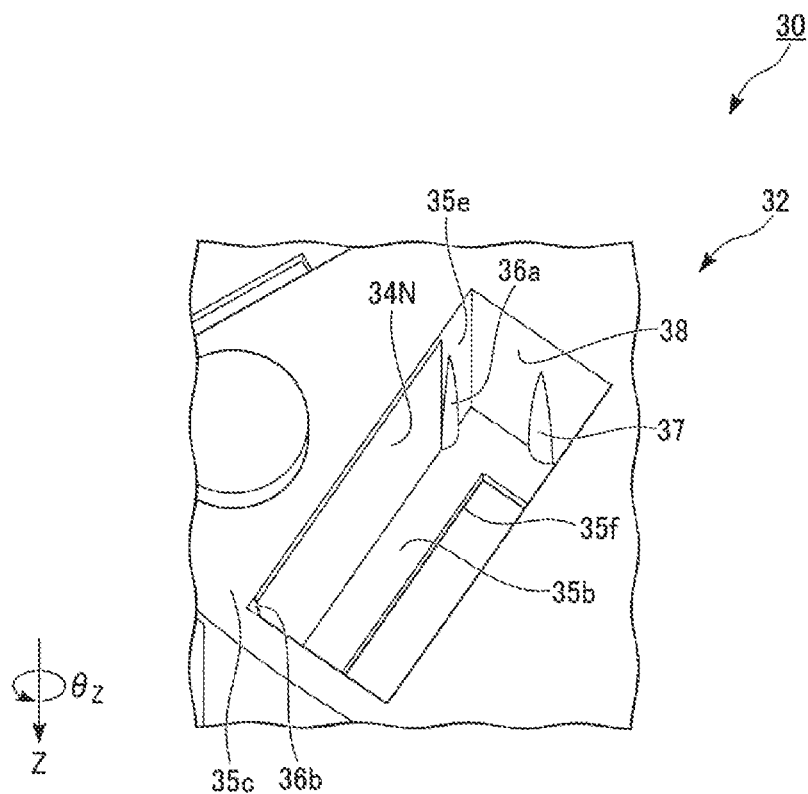
FIG. 6 is a perspective view of a portion of the rotor of the first exemplary embodiment.

FIG. 2 and FIG. 3 are perspective views of the rotor 30. FIG. 4 illustrates the rotor 30, and is a cross-section of IV-IV from FIG. 1. FIG. 5 is a partially enlarged view of FIG. 4. FIG. 6 is a perspective view of a portion of the rotor 30. In FIG. 6, illustration of the permanent magnet 33A is omitted.

As shown in FIG. 2 to FIG. 4, the rotor body unit 32 has a plurality of permanent magnets 33A, 33B, a plurality of core piece parts 34N, 34S, and a mold resin part 35. That is, the rotor 30 has a plurality of permanent magnets 33A, 33B, a plurality of core piece parts 34N, 34S, and a mold resin part 35.

The permanent magnets 33A, 33B magnetize the core piece parts 34N, 34S. In this embodiment, the core piece parts 34N, 34S are made of a laminated steel plate which is formed by laminating a plurality of electromagnetic steel plates. The electromagnetic steel plate is a type of magnetic material. As shown in FIG. 4, the permanent magnet 33A and the permanent magnet 33B are alternately arranged in the circumferential direction. Each of the permanent magnet 33A, 33B is inserted into a magnet insertion hole 38 which is to be described in detail later. The permanent magnets 33A, 33B respectively have two magnetic poles arranged in the circumferential direction. The permanent magnet 33A has, for example, the N-pole on the driving side (+θZ side), and the S-pole on the counter driving side (−θZ side). The permanent magnet 33B has, for example, the S-pole on the driving side (+θZ side), and the N-pole on the counter driving side (−θZ side). Accordingly, the magnetic poles of the circumferentially neighboring permanent magnets 33A, 33B are arranged to face each other with identical polarity.

The permanent magnet 33A and the permanent magnet 33B are configured the same way, except for the arrangement of magnetic poles in the circumferential direction. For this reason, in the following descriptions, only the permanent magnet 33A may be explained as a representation of the permanent magnets, and explanations related to the permanent magnet 33B may be omitted.

As shown in FIG. 5, the permanent magnet 33A is in direct contact with the core piece part 34S disposed on the counter driving side (−θZ side) of the magnet insertion hole 38 which is to be described in detail later. For this reason, the permanent magnet 33A is stably attached to the core piece part 34S by magnetic force and the permanent magnet 33A is stably retained in the magnet insertion hole 38. In the present embodiment, the permanent magnet 33A is in contact with a surface on the counter driving side and a surface on the outer side of the magnet insertion hole 38 in the circumferential direction. The permanent magnet 33A is extended in the radial direction. The shape of the cross section perpendicular to the axial direction of the permanent magnet 33A (Z-axis direction) is, for example, quadrangular.

In the present description, a quadrangular shape includes a substantially quadrangular shape. A substantially quadrangular shape includes a state where the quadrangular corners are chamfered. In the example shown in FIG. 5, a magnet corner part 33Aa, which is a corner portion of the driving side (+θZ side) among each corner on a radially outer side of the permanent magnet 33A, is chamfered.

Also in the present description, being chamfered includes the meaning of being cut. The method of cutting is not limited in specific, and it may be either angular chamfer or round chamfer.

The number of the permanent magnet 33A provided in the present embodiment is, for example, seven. The number of the permanent magnet 33B is also, for example, seven. That is, the number of the permanent magnet 33A and the number of the permanent magnet 33B are identical. Also, the number of the permanent magnets 33A, 33B may be appropriately altered in accordance with the purpose of the motor.

As shown in FIG. 4, the core piece parts 34N, 34S are arranged along the circumferential direction at a radially outer side of the shaft 31. The core piece part 34N and the core piece part 34S are alternately arranged along the circumferential direction. The core piece part 34N is disposed between the N-pole of the permanent magnet 33A and the N-pole of the permanent magnet 33B. Accordingly, the core piece part 34N is magnetized to the N-pole. The core piece part 34S is disposed between the S-pole of the permanent magnet 33A and the S-pole of the permanent magnet 33B. Accordingly, the core piece is magnetized to the S-pole.

In the present embodiment, the core piece parts 34N, 34S are connected to each other only by the mold resin part 35. That is, other than the mold resin part 35, the rotor 30 does not have any other portion to connect the core piece parts 34N, 34S to each other, and the core piece parts 34N, 34S are separated. Accordingly, when the mold resin part 35 is to be shaped by a resin mold, for example, the resin may easily drip down between core piece parts 34N, 34S. Also, it is possible to inhibit the magnetic flux inside the core piece parts 34N, 34S from leaking radially inward.

The core piece part 34N and the core piece part 34S are configured the same way, except for the polarity in which they are magnetized. For this reason, in the following descriptions, only the core piece part 34N may be explained as a representation of the core piece parts.

As shown in FIG. 5, a core piece corner 34c, which is a corner portion of the counter driving side (−θZ side) among each corner on a radially outer side of the core piece part 34N, is chamfered. In the present embodiment, each corner on the outer side of the core piece part 34N in the circumferential direction is chamfered, for example, in both circumferential directions, as shown in FIG. 4. A radially inner end portion of the core piece part 34N is disposed at a radially outer side than a radially inner end portion of the permanent magnet 33A.

The number of the core piece part 34N provided in the present embodiment is, for example, seven. The number of the core piece 34S is also, for example, seven. That is, the number of the core piece part 34N and the number of the core piece part 34S are identical. The number of the permanent magnets 33A, 33B is identical to the number of the core piece parts 34N, 34S. Further, the number of the core piece parts 34N, 34S may be appropriately altered, as long as they match the number of the permanent magnets 33A, 33B.

The mold resin part 35 is disposed between the plurality of core piece parts 34N, 34S. The mold resin part 35 is made of resin. In the present embodiment, the plurality of core pieces 34N, 34S are retained in the mold resin part 35. Except for the lid part 35d which will be described in detail later, the mold resin part 35 is a single member. The mold resin part 35 is formed by, for example, a resin molding which involves disposing the core piece parts 34N, 34S to a mold, and pouring resin therein. Also, except for the lid part 35d, all portions of the mold resin part 35 may be formed of a plurality of resins.

In the present description, the mold resin part being disposed between the plurality of core pieces refers to the meaning that at least a portion of the mold resin part is located on a line that connects any two core piece parts of the plurality of core piece parts. The two core piece parts of the plurality of core piece parts are not particularly limited, and they may be two circumferentially neighboring core piece parts, or two core piece parts that face each other in the radial direction a cross the shaft 31.

As shown in FIG. 2, the mold resin part 35 has, for example, a substantially cylindrical shape. The mold resin part 35 has an outer resin part 35a, an upper cover part 35b, a lower cover part 35c, and a lid part 35d. Also as shown in FIG. 4, the mold resin part 35 has an inner resin part 35e.

The outer resin part 35a is disposed at a radially outer side of the permanent magnets 33A, 33B. The outer resin part 35a is disposed in plurality per every permanent magnet 33A, 33B. As shown in FIG. 5, in the present embodiment, a portion of the outer resin part 35a is disposed on the chamfered portion of the core piece part 34N. That is, since the core piece corner 34c of the core piece part 34N is chamfered, it is possible to increase the volume of the outer resin part 35a, and increase the thickness of the outer resin part 35a, when compared to a case in which the core piece corner 34c is not chamfered. Thus, by installing an outer first guide part 36b to the outer resin part 35a, for example, it is easy to make the outer first guide part 36b in a stable manner.

As shown in FIG. 4, the inner resin part 35e is a part located at a radially inner side of the permanent magnets 33A, 33B and the core piece parts 34N, 34S in the rotor 30. The inner resin part 35e is coupled to the outer surface of the shaft 31 in the circumferential direction. As shown in FIG. 5, a portion of the inner resin part 35e overlaps with the permanent magnet 33A in the radial direction.

According to the present embodiment, a circumferential inner end portion of the core piece part 34N is disposed at a radially outer side than a circumferential inner end portion of the permanent magnet 33A. For this reason, it is easy to increase the thickness of a radially overlapping portion of the inner resin part 35e and the permanent magnet 33A.

Accordingly, by installing an inner first guide part 36a, which is to be described in detail later, to a radially overlapping portion of the inner resin part 35e and the permanent magnet 33A, it is easy to make the inner first guide part 36a in a stable manner.

As shown in FIG. 2, the upper cover part 35b is disposed at a radially upper side (+Z side) of the core piece parts 34N, 34S. The upper cover part 35b has, for example, a disc shape. An end portion of the upper side of the outer resin part 35a is integrally connected to the upper cover part 35b. Accordingly, the upper cover part 35b connects the plurality of outer resin parts 35a. Also, the exterior shape of the upper cover part 35b may be appropriately altered, as long as it matches the exterior shape of the rotor 30.

The upper cover part 35b has at least one cover part through hole 35f which penetrates through the upper cover part 35b in the axial direction (Z-axis direction). In this embodiment, the cover part through hole 35f is provided in plurality along the circumferential direction. The cover part through hole 35f overlaps with the magnet insertion hole 38, which is to be described in detail later, and the permanent magnet 33A or the permanent magnet 33B in the axial direction. For this reason, a worker can visually confirm through the cover part through hole 35f that the permanent magnets 33A, 33B are properly inserted into the magnet insertion hole 38. As shown in FIG. 6, which is to be described in detail later, the opening part area of the cover part through hole 35f is smaller than the opening part of the axially upper side of the magnet insertion hole 38.

The lower cover part 35c is disposed at an axially lower side (−Z side) of the core piece parts 34N, 34S. The lower cover part 35c has, for example, a disc shape. An end portion of the lower side of the outer resin part 35a is integrally connected to the lower cover part 35c. Accordingly the lower cover part 35c connects the plurality of outer resin parts 35a. Also, the exterior shape of the lower cover part 35c may be appropriately altered as long as it matches the exterior shape of the rotor 30. Preferably, the shape of the lower cover part 35c is identical to the shape of the upper cover part 35b.

As shown in FIG. 6, at least one magnet insertion hole 38 is provided to the lower cover part 35c. The magnet insertion hole 38 is where the permanent magnet 33A is inserted into. As shown in FIG. 5, the magnet insertion hole 38 is disposed between the circumferentially neighboring core piece parts 34N, 34S. That is, the magnet insertion hole is provided to a space between the neighboring core piece parts 34N, 34S in the circumferential direction. The magnet insertion hole 38 is adjacent to the circumferentially neighboring core piece parts 34N, 34S. Further, a portion of the inner surface of the magnet insertion hole 38 is the surface of the core piece parts 34N, 34S in the circumferential direction. Also, preferably, the number of the magnet insertion hole 38 is equal to the sum of the number of the permanent magnet 33A and the number of the permanent magnet 33B.

As shown in FIG. 6, the magnet insertion hole 38 extends in the axial direction (Z-axis direction). Specifically, the inner surface which constitutes the magnet insertion hole 38 extends toward the axial direction (Z-axis direction). In the present embodiment, the magnet insertion hole 38 extends from the bottom surface of the lower cover part 35c to the bottom surface of the upper cover part 35b. In other words, the inner surface which constitutes the magnet insertion hole 38 extends from the bottom surface of the lower cover part 35c to the bottom part of the upper cover part 35b. That is, the floor surface of the magnet insertion hole 38 is the bottom surface of the upper cover part 35b. The cover part through hole 35f us provided to the floor surface of the magnet insertion hole 38. As shown in FIG. 5, the shape of the cross section perpendicular to the axial direction of the magnet insertion hole 38 is, for example, quadrangular, which extends to the radial direction. Further, the shape of the magnet insertion hole 38 may be appropriately altered as long as it matches the shape of the permanent magnets 33A, 33B.

In the present description, the magnet insertion hole includes a gap between the facing surfaces of the neighboring core piece parts. Also in the present description, the magnet insertion hole includes a hole which is formed by extending the gap between the facing surfaces of the neighboring core piece parts in the axial direction.

For example, in the example shown in FIG. 5, the magnet insertion hole 38 includes the entire gap between a counter driving side surface 34b on the counter driving side (−θZ side) of the core piece part 34N and a driving side surface 34a of the driving side (+θZ side) of the core piece part 34S. Also, the magnet insertion hole 38 includes a hole which is formed by extending the gap between the driving side surface 34a and the counter driving side surface 34b in the axial direction.

Although it is not illustrated in the drawings, the end portion of the upper side (+Z side) of the inner resin part 35e shown in FIG. 4 is integrally connected to the upper cover part 35b. The end portion of the lower side (−Z side) of the inner resin part 35e is integrally connected to the lower cover part 35c. Accordingly, the inner resin part 35e and the outer resin part 35a are connected via the upper cover part 35b and the lower cover part 35c.

As shown in FIG. 3, the lid part 35d is attached to the lower side (−Z side) of the lower cover part 35c. The exterior shape of the lid part 35d is substantially identical to the lower cover part 35c. The lid part 35d closes each of the magnet insertion hole 38 at the lower side (−Z side).

As shown in FIG. 5, the mold resin part 35 has at least one first guide part provided inside the magnet insertion hole 38. More specifically, the mold resin part 35 has an inner first guide part 36a, an outer first guide part 36b, and a second guide part 37. The inner first guide part 36a, the outer first guide part 36b, and the second guide part 37 are provided inside the magnet insertion hole 38. That is, at least two first guide parts are provided inside the magnet insertion hole 38. At least one second guide part is provided inside the magnet insertion hole 38.

In the present embodiment, the mold resin part 35 has the inner first guide part 36a, the outer first guide part 36b, and the second guide part 37. For this reason, when the mold resin part 35 is shaped by a resin mold, for example, the inner first guide part 36a, the outer first guide part 36b, and the second guide part 37 are formed simultaneously. Thus, it is easy to install the inner first guide part 36a, the outer first guide part 36b, and the second guide part 37 to the rotor 30, and thereby the productivity of the motor 10 is improved.

The inner first guide part 36a and the outer first guide part 36b are disposed at a more driving side (+θZ side) than a center CL1 between the neighboring core piece parts 34N, 34S in the circumferential direction. In the present embodiment, the inner first guide part 36a and the outer first guide part 36b are disposed closer to the driving side than the center CL1 in every magnet insertion hole 38. That is, all inner first guide part 36a and all outer first guide part 36b are disposed on the same side in the circumferential direction with respect to the center CL1 in the magnet insertion hole 38. Meanwhile, all inner first guide parts 36a and all outer first guide parts 36b do not necessarily need to be disposed on the same side in the circumferential direction with respect to the center CL1 in the magnet insertion hole 38.

The inner first guide part 36a and the outer first guide part 36b cover a portion of a surface on the driving side (+θZ side) of the magnet insertion hole 38. In the present embodiment, the inner first guide part 36a and the outer first guide part 36b are provided to the surface on the driving side of the magnet insertion hole.

The inner first guide part 36a is disposed at a radially inner side than the center of the magnet insertion hole 38 in the radial direction. The outer first guide part 36b is disposed at a radially outer side than the center of the magnet insertion hole 38 in the radial direction. That is, in the present embodiment, at least one first guide part is provided respectively at a radially inner side than the center of the magnet insertion hole 38 and at a radially outer side than the center of the magnet insertion hole 38 in the radial direction.

In the present embodiment, the inner first guide part 36a and the outer first guide part 36b are in contact with the permanent magnet 33A. More specifically, the inner first guide part 36a is in contact with a surface on the driving side (+θZ side) of the permanent magnet 33A. The outer first guide part 36b is in contact with the chamfered magnet corner part 33Aa of the permanent magnet 33A. For this reason, it addition to the attachment by magnetic force, the permanent magnet 33A is coupled to the core piece part 34S by the inner first guide part 36a and the outer first guide part 36b. Accordingly, the permanent magnet 33A is stably retained inside the magnet insertion hole 38.

As shown in FIG. 6, the inner first guide part 36a is a rib protrudes inside the magnet insertion hole 38. For this reason, when the inner first guide part 36a is in contact with the permanent magnet 33A as shown in the present embodiment, it is possible to reduce the contact area between the inner first guide part 36a and the permanent magnet 33A. Accordingly, it is possible to inhibit, for example, iron, etc. that is adhered to the plating provided on a surface of the permanent magnet 33A or to the permanent magnet 33A from peeling off from the permanent magnet 33A. Thus, it is also possible to inhibit contamination from occurring inside the magnet insertion hole 38.

As shown in FIG. 5, in the present embodiment, the inner first guide part 36a protrudes from a surface on the driving side (+θZ side) of the magnet insertion hole 38 toward the counter driving side (−θZ side). The inner first guide part 36a is provided to the inner resin part 35e. That is, the inner first guide part 36a is provided to a portion having a relatively greater thickness in the mold resin part 35. For this reason, it is possible to make the inner first guide part 36a, which is a rib, in a stable manner. Also, due to such structure, it is possible to enhance the rigidity of the inner first guide part 36a.

The inner first guide part 36a is disposed at a radially inner side than a surface on the counter driving side adjacent to the magnet insertion hole 38 of the core piece part 34N. For this reason, it is easy to install the inner first guide part 36a, which is a rib, to a portion having a relatively greater thickness in the mold resin part 35, that is, in the present embodiment, the inner resin part 35e.

Figure 7:
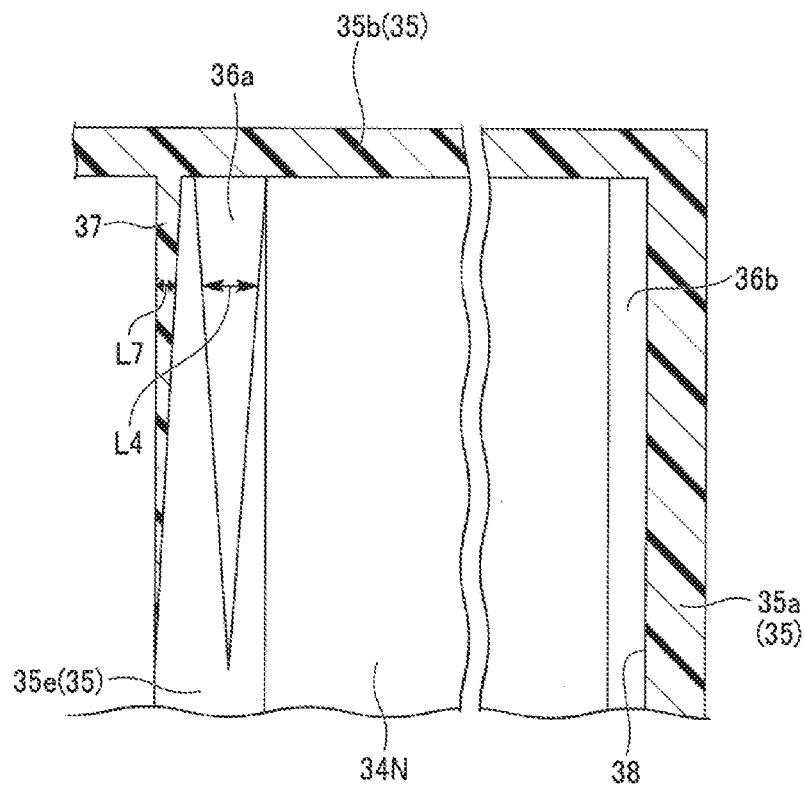
FIG. 7 is a cross-sectional view of a first guide part and a second guide part of the first exemplary embodiment.
Figure 7:
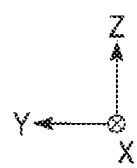
Figure 8:
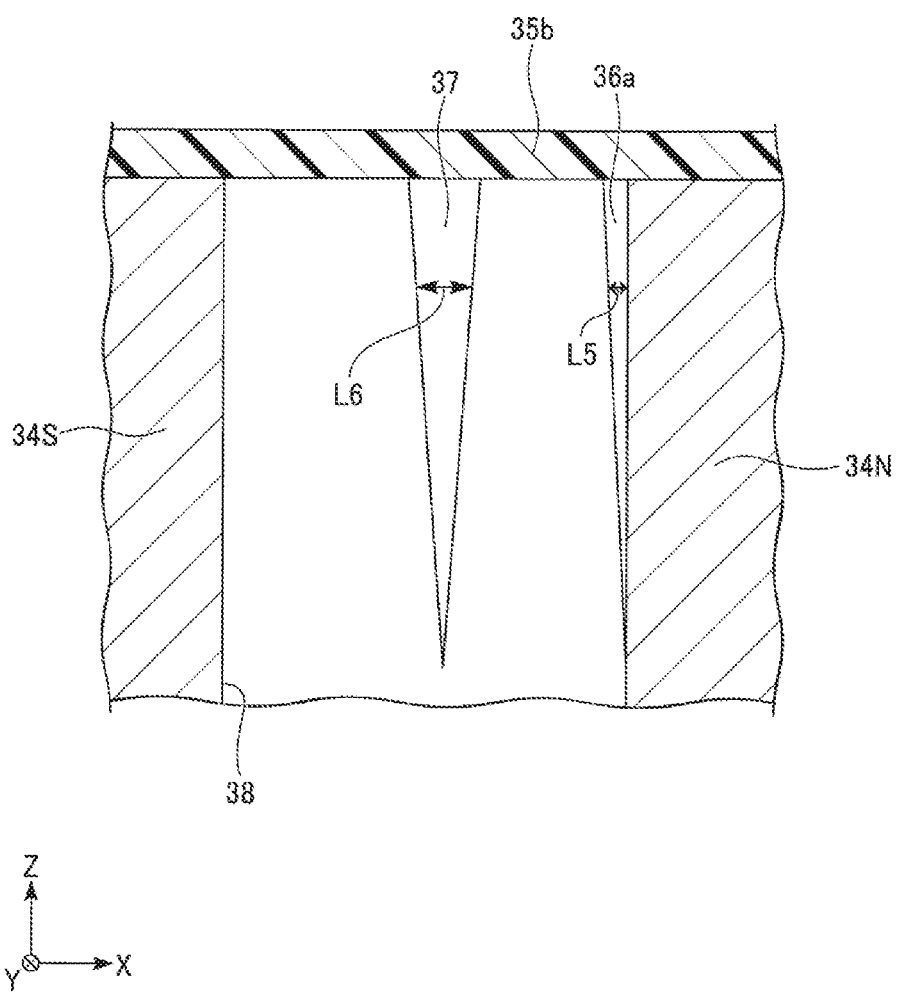
FIG. 8 is a cross-sectional view of the first guide part and the second guide part of the first exemplary embodiment.

FIG. 7 and FIG. 8 are cross-sectional views of the inner first guide part 36a, the outer first guide part 36b, and the second guide part 37. FIG. 7 illustrates the inside of the magnet insertion hole 38 shown in FIG. 5 as viewed from the −X side. FIG. 8 illustrates the inside of the magnet insertion hole 38 shown in FIG. 5 as viewed from the −Y side. Illustration of the permanent magnet 33A is omitted in FIG. 7 and FIG. 8.

As shown in FIG. 7 and FIG. 8, the inner first guide part 36a extends in the axial direction (Z-axis direction). More specifically, the inner first guide part 36a extends from the upper cover part 35b to the lower side (−Z side). That is, the inner first guide part 36a is connected to the upper cover part 35b. For this reason, it is possible to enhance the rigidity of the inner first guide part 36a, which is a rib.

As shown in FIG. 7, in a perpendicular direction (Y-axis direction) to both a protruding direction of the inner first guide part 36a (X-axis direction) and the axial direction (Z-axis direction), the width L4 of the inner first guide part 36a increases toward the upper side (+Z side). For this reason, when the mold resin part 35 and the magnet insertion hole 38 are shaped, for example, by resin molding, it is easy to pull down the mold to the lower side (−Z side).

As shown in FIG. 8, in a protruding direction of the inner first guide part 36a (X-axis direction), the width L5 of the inner first guide part 36a increases toward the upper side (+Z side). For this reason, when the mold resin part 35 and the magnet insertion hole 38 are shaped, for example, by resin molding, it is easy to pull down the mold to the lower side (−Z side).

As shown in FIG. 5, the shape of the cross section perpendicular to the extending direction of the inner first guide part 36a (Z-axis direction) is semicircular. Accordingly, it is easy to make a mold for the mold resin part 35 when compared to a case in which the shape of the cross section of the inner first guide part 36a is tapered. Also due to such shape, burrs are unlikely to occur in the inner first guide portion 36a.

When the inner first guide part 36a and the permanent magnet 33A are in contact with each other, the permanent magnet 33A may be pushed hard against the inner first guide part 36a. In such case, when the inner first guide part 36a has a tapered shape, for example, the contact area between the inner first guide part 36a and the permanent magnet 33A decreases. When the contact area between the inner first guide part 36a and the permanent magnet 33A is too small, the weight per unit area added to the permanent magnet 33A from the inner first guide part 36a increases. Also, a plating layer may be formed on a surface of the permanent magnet 33A, or iron, etc. may be adhered to thereto. In such case, when the permanent magnet 33A is inserted, it is possible that the plating or the iron, etc. on the surface of the permanent magnet 33A may be peeled off from the permanent magnet 33A by the weight added from the inner first guide part 36a.

According to the present embodiment, the shape of the cross section of the inner first guide part 36a is semicircular. For this reason, in case the permanent magnet 33A is pushed hard against the inner first guide part 36a, the contacting area between the permanent magnet 33A and the first guide part 36a is easily secured by the elastic deformation of the inner first guide part 36a. Accordingly, it is possible to inhibit the weight per unit area added to the permanent magnet 33A from increasing. It is also possible to inhibit the plating provided on a surface of the permanent magnet 33A and the iron, etc. adhered to the permanent magnet 33A from being peeled off from the permanent magnet 33A. This way, it is possible to further inhibit contamination from occurring inside the magnet insertion hole 38.

In the present description, a semicircular shape includes a semielliptical shape, for example. Also in the present description, a semicircular shape includes a half circle along the line passing through the center of a full circle, and the shape of a portion cut along the line shifted from the center of a full circle.

Among the corner parts on a radially outer side of the magnet insert hole 38, the outer first guide part 36b is disposed at a corner part on the driving side (+θZ side). Here, in the present embodiment, the magnet corner part 33Aa of the permanent magnet 33A is chamfered, as described above. For this reason, the permanent magnet 33A easily becomes in contact with a surface on a radially outer side of the magnet insert hole 38 while in contact with the outer first guide part 36b, even when the outer first guide part 36b is provided at the corner part of the magnet insertion hole 38 as in the present embodiment. Accordingly, the permanent magnet 33A is stably retained inside the magnet insertion hole 38.

The outer first guide part 36b is disposed at a radially outer side than the counter driving side surface 34b of the core piece part 34N. The outer first guide part 36b is provided to the outer resin part 35a. As shown in FIG. 6 and FIG. 7, the outer first guide part 36b has, for example, a substantially triangular prism shape which extends throughout the entire axial direction (Z-axis direction) of the magnet insertion hole 38.

The second guide part 37 is disposed at a more radially inner side than the center of the magnet insertion hole 38 in the radial direction. The second guide part 37 covers a portion of a surface on a radially inner side of the magnet insertion hole 38. In the present embodiment, the second guide part 37 is provided to the surface on a radially inner side of the magnet insertion hole 38.

According to the present embodiment, with the second guide part 37 provided, the permanent magnet 33A can positioned closer to the opposite side of the second guide portion 37 in the radial direction inside the magnet insertion hole 38. For this reason, it becomes easier to match the radial position of the permanent magnets 33A, 33B. As a result, the balance of the magnetic flux passing through the rotor 30, and the balance of the center of weight of the rotor 30 is easily stabilized both in the circumferential direction and the radial direction.

In the present embodiment, the second guide part 37 is disposed at a radially inner side than the center of the magnet insertion hole 38 in the radial direction. For this reason, the permanent magnet 33A is disposed closer to a radially outer side. Accordingly, the permanent magnet 33A is arranged closer to the stator 40 which is disposed a radially outer side of the rotor 30. Thus, the magnetic force acting between the permanent magnet 33A and the stator 40 is increased, and as a result, the rotational torque of the motor 10 is enhanced.

In the present embodiment, the second guide part 37 is in contact with the permanent magnet 33A. More specifically, the second guide part 37 is in contact with a surface on a radially inner side of the permanent magnet 33A. Accordingly, the permanent magnet 33A is stably disposed closer to a radially outer side inside the magnet insertion hole 38.

In the present embodiment, the second guide part 37 disposed, for example, at the center of the neighboring core piece parts 34N, 34S in the circumferential direction. That is, the center of the second guide part 37 in the circumferential direction overlaps with the center CL1 between the neighboring core pieces 34N, 34S in the circumferential direction. Accordingly, the second guide part 37 is in contact with the vicinity of the center of a surface on a radially inner of the permanent magnet 33A in the circumferential direction. For this reason, it is easy to stably support the permanent magnets 33A from a radially inner side within the magnet insertion hole 38.

As shown in FIG. 6, the second guide part 37 is a rib protruding inside the magnet insertion hole 38. As shown in FIG. 5, the second guide part 37 protrudes radially outward from a surface on a radially inner side of the magnet insertion hole 38. The second guide part 37 is provided to the inner resin part 35e. The second guide part 37 is disposed at a radially inner side than the counter driving side surface 34b adjacent to the magnet insertion hole 38 of the core piece part 34N.

As shown in FIG. 7 and FIG. 8, the second guide part 37 extends in the axial direction (Z-axis direction). More specifically, the second guide part 37 extends from the upper cover part 35b to the lower side (−Z side). As shown in FIG. 8, in a perpendicular direction (X-axis direction) to a protruding direction (Y-axis direction) of the second guide part 37, the width L6 of the second guide part 37 increases toward the upper side (+Z side). As shown in FIG. 7, in a protruding direction (Y-axis direction) of the second guide part 37, the width L7 of the second guide part 37 increases toward the upper side. As shown in FIG. 5, the shape of the cross section perpendicular to the extending direction (Z-axis direction) of the second guide part 37 is semicircular.

As described above, the second guide part 37 is a rib as the inner first guide part 36a, and therefore generates the same effect which the inner first guide part 36a generates as a rib.

As shown in FIG. 5, in the present embodiment, L1 is a distance in the circumferential direction between an end portion on the counter driving side (−θZ side) of the inner first guide part 36a and the core piece part 34S on the counter driving side of the magnet insertion hole 38. L2 is the width in the circumferential direction of the permanent magnet 33A. L3 is a distance in the circumferential direction between an end portion on the counter driving side of the inner first guide part 36a and the core piece part 34N on the driving side (+θZ side) of the magnet insertion hole 38. Here, with respect to the distance L1, width L2 and distance L3, the motor 10 of the present embodiment satisfies the relationship L1−L2<L3. The relationship is also satisfied when L3 is a distance in the circumferential direction between an end portion on the counter driving side of the outer first guide part 36b and the core piece part 34N.

Accordingly, regardless of the circumferential position of the permanent magnet 33A, the distance in the circumferential direction between a surface on the counter driving side (−θZ side) of the permanent magnet 33A and the core piece part 34S is smaller than the distance in the circumferential direction between a surface on the driving side (+θZ side) of the permanent magnet 33A and the core piece part 34N. For this reason, the magnetic force between the core piece part 34S and the permanent magnet 33B is bigger than the magnetic force between the core piece 34N and the permanent magnet 33A, regardless of the circumferential position of the permanent magnet 33A. Therefore, the permanent magnet 33A inserted to the magnet insertion hole 38 is attached to the core piece part 34S by magnetic force.

As described above, according to the present embodiment, it is possible to attach the permanent magnet 33A by magnetic force to the core piece part 34S on the side where the inner first guide part 36a and the outer first guide part 36b are not provided (−θZ side). As a result, it is easy to attach the permanent magnets 33A, 33B by magnetic force to the core piece parts 34N, 34S disposed on the same circumferential side. Accordingly, it is possible to inhibit the magnetic flux passing through the rotor 30 from scattering, and the balance of the center of gravity of the rotor 30 in the circumferential direction from becoming off-balanced. As a result, it is possible to acquire the motor 10 having a structure to inhibit the vibration and the noise which are caused by the rotation of the rotor 30.

Also as a result, according to the present embodiment, it is possible to employ a method of integrally forming the core piece parts 34N, 34S into a single unity by using resin molding, and then disposing the permanent magnets 33A, 33B between the core piece parts 34N, 34S in the circumferential direction. Accordingly, when the core piece parts are integrally formed by resin molding, the magnetic force of the permanent magnets 33A, 33B is prevented from being reduced by the heat generated from the resin.

In the present embodiment, the permanent magnet 33A is in direct contact with the inner first guide part 36*a*, the outer first guide part 36*b*, and the core piece part 34S. Accordingly, the distance L1 and the width L2 are identical.

Also in the present description, the width in the circumferential direction includes a width of an object in a direction perpendicular to both a line which passes through one point in the circumferential direction of the object and the axial direction. For example, the width L2 in the circumferential direction of the permanent magnet 33A includes a width of the permanent magnet 33A in a direction perpendicular to a line which passes through the center of the permanent magnet 33A in the circumferential direction and also to the axial direction. The same applies to the distance in the circumferential direction. That is, the distance in the circumferential direction includes a distance of the object in a direction perpendicular to a line in the radial direction passing through one point in the circumferential direction of the object and to the axial direction.

Since the structure of the present embodiment allows the permanent magnet 33A to be attached to the intended core piece part 34N, 34S by magnetic force, disposing a separate member on the driving side (+θZ side) of the permanent magnet 33A to add force to the core piece parts can be considered. Here, the separate member may be, for example, a spring. In such structure, when the permanent magnet 33A is attached to the core piece part 34N by magnetic force, the permanent magnet 33A is separated to the core piece part 34S side by, for example, the elastic force of a spring. However, with such configuration, when the permanent magnet 33A is pulled away from the core piece part 34N, there is a possibility that the permanent magnet 33A may be damaged. Here, the damage refers to, for example, the plating on a surface of the permanent magnet 33A peeling off, etc.

According to the present embodiment, when the permanent magnet 33A is inserted to the magnet insertion hole 38, the permanent magnet 33A is inhibited from adhering to the core piece part 34N on the unintended side by magnetic force. Therefore, the permanent magnet 33A is inhibited from being damaged.

Also according to the present embodiment, all inner first guide parts 36*a* and all outer first guide parts 36*b* are disposed on the same circumferential side with respect to the center CL1. Therefore, all permanent magnets 33A, 33B are adhered to the core piece parts 34N, 34S on the same circumferential side by magnetic force. Accordingly, the vibration and the noise caused by the rotation of the rotor 30 are further inhibited.

According to the present embodiment, there are two types of first guide part, which are the inner first guide part 36*a* and the outer first guide part 36*b*. Therefore, the permanent magnet 33A is inhibited from being inclined in the circumferential direction, and the permanent magnet 33A is adhered to the first guide part and the core piece part 34S on the opposite side by magnetic force while keeping a good balance. Also when the first guide part is in contact with the permanent magnet 33A, the permanent magnet 33A is retained inside the magnet insertion hole in a more stable manner.

According to the present embodiment, the inner first guide part 36*a* is disposed at a radially inner side than the center of the magnet insertion hole 38 in the radial direction. The outer first guide part 36*b* is disposed on a radially outer side than the center of the magnet insertion hole 38 in the radial direction. For this reason, when the rotor 30 is manufactured, it is easy to guide the permanent magnet 33A to the core piece part 34S side (-θZ side) in both circumferential directions, while keeping good balance. The permanent magnet 33A is more securely adhered to the first guide part and the core piece part 34S on the opposite side by magnetic force. Also when the first guide part is in contact with the permanent magnet 33A, the permanent magnet 33A is retained inside the magnet insertion hole 38 in a more stable manner.

According to the present embodiment, the shape of the cross section perpendicular to the axial direction of the permanent magnet 33A is quadrangular. Therefore, the permanent magnet 33A is retained inside the magnet insertion hole 38 in a more stable manner by the first guide part provided on both sides of the center of the magnet insertion hole 38 in the circumferential direction.

Also, the present embodiment may employ the below described configuration. In the below description, the constitutions identical to the foregoing description will be referred to with the same reference numbers, and those constitutions may not be explained in detail.

The present embodiment may configure the mold resin part 35 to have at least one first guide part provided inside the magnet insertion hole 38. That is, only one first guide part may be provided in the mold resin part 35, or a plurality (for example, three or more) of first guide parts may be provided therein.

Figure 9:
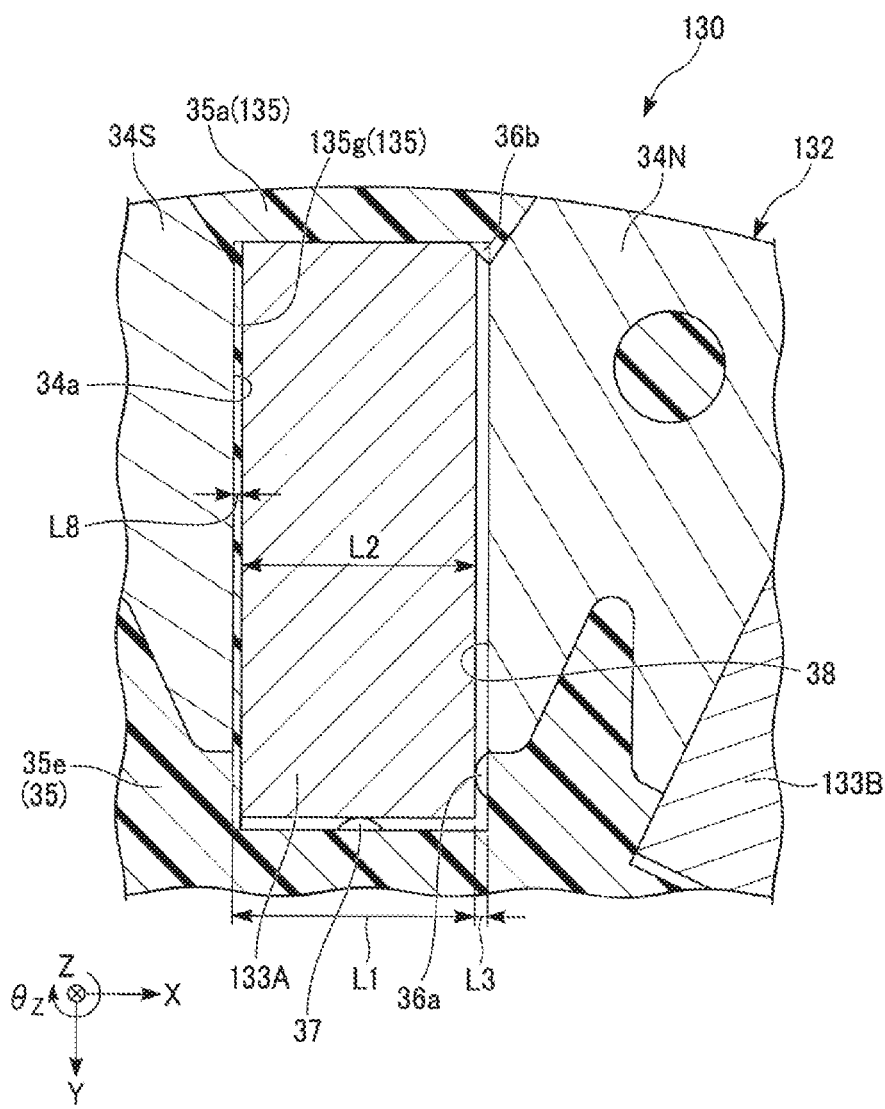
FIG. 9 is a partially enlarged view of another example of the rotor of the first exemplary embodiment.

The present embodiment may configure the permanent magnet 33A to be in direct contact or in indirect contact via resin with the core piece part 34S on the counter driving side (-θZ side) of the magnet insertion hole 38. That is, the permanent magnet 33A as shown in FIG. 9 may be in indirect contact with the core piece part 34S on the other circumferential side of the magnet insertion hole 38 via resin. In the following description, the resin disposed between the permanent magnet 33A and the core piece part 34S is referred to as an interposed resin part 135*g*.

FIG. 9 is a cross-sectional view which illustrates a portion of a rotor 130 according to another example of the present embodiment. As shown in FIG. 9, the rotor 130 has a rotor body unit 132. The rotor body unit 132 has permanent magnets 133A, 133B, core piece parts 34N, 34S, and a mold resin part 135. The shape of the permanent magnets 133A, 133B is identical to the permanent magnets 33A, 33B as shown in FIG. 5, except for that the width L2 in the circumferential direction is a little smaller.

The mold resin part 135 has an interposed resin part 135*g*. The interposed resin part 135*g* is provided inside the magnet insertion hole 38. The interposed resin part 135*g* is in contact with a surface on the counter driving side (-θZ side) of the magnet insertion hole 38. That is, the interposed resin part 135*g* is in contact with the driving side surface 34*a* of the core piece part 34S. The interposed resin part 135*g* has the shape of a wall which covers the entire surface on the counter driving side of the magnet insertion hole 38. The interposed resin part 135*g* is in contact with the outer resin part 35*a* and the inner resin part 35*e*. Although it is not illustrated in the drawings, the interposed resin part 135g is connected to the upper cover part 35b and the lower cover part 35c.

With such configuration, the permanent magnet 133A is in indirect contact with the core piece part 34S on the counter driving side (−θZ side) of the magnet insertion hole 38 through the interposed resin part 135g. The relation of L1−L2<L3 is also satisfied. Here, the value obtained by subtracting the width L2 from the distance L1 corresponds to the width L8 in the circumferential direction of the interposed resin part 135g. That is, the width L8 in the circumferential direction of the interposed resin part 135g is smaller than the distance L3 in the circumferential direction between an end portion on the counter driving side of the inner first guide part 36a and the core piece part 34N on the driving side (+θZ side) of the magnet insertion hole 38.

Accordingly, as shown in the configuration of FIG. 1 to FIG. 8, the permanent magnet 133A is adhered to the core piece part 34S on the intended side by magnetic force. Therefore, the vibration and the noise caused by the rotation of the rotor 130 are inhibited.

According to this configuration, the permanent magnet 133A is not in direct contact with the core piece part 34S. Therefore, for example, when the need to separate the permanent magnet 133A once from the magnet insertion hole 38 occurs, it is easy to pull the permanent magnet 133A away from the magnet insertion hole 38. It is also possible to inhibit a surface of the permanent magnet 133A from being damaged at that time.

The present embodiment may configure the first guide part to cover at least a portion of a surface on the driving side (+θZ side) of the magnet insertion hole 38. That is, the first guide part as shown in FIG. 10 may cover the entire surface on the driving side of the magnet insertion hole 38.

Figure 10:
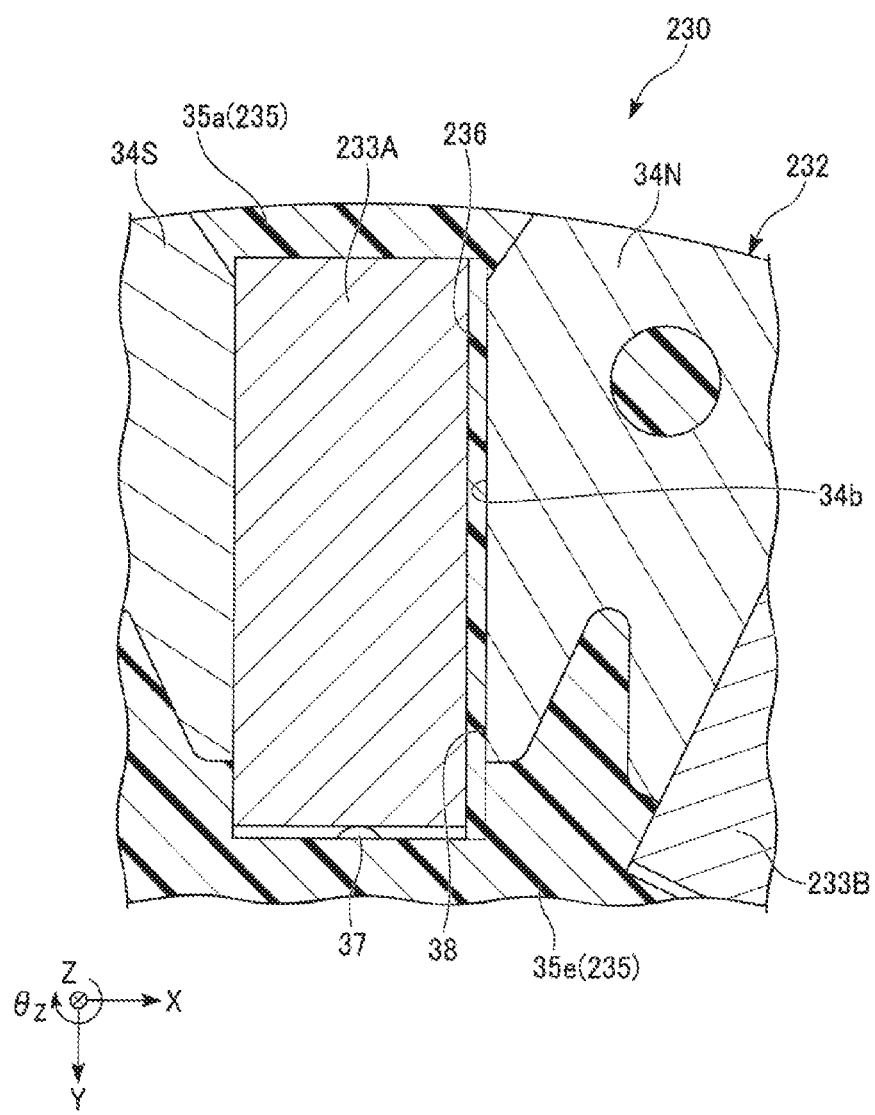
FIG. 10 is a partially enlarged view of another example of the rotor of the first exemplary embodiment.

FIG. 10 is a cross-sectional view which illustrates a portion of a rotor 230 according to another example of the present embodiment. As shown in FIG. 10, the rotor 230 has a rotor body unit 232. The rotor body unit 232 has permanent magnets 233A, 233B, core piece parts 34N, 34S, and a mold resin part 235. The permanent magnets 233A, 233B are identical to the permanent magnets 33A, 33B shown in FIG. 5, etc., except for that each corner part is not chamfered.

The mold resin part 235 has a first guide part 236 and a second guide part 37. The first guide part 236 has the shape of a wall which covers the entire surface on the driving side (+θZ side) of the magnet insertion hole 38. The first guide part 236 is in contact with the counter driving side surface 34b of the core piece part 34N. The first guide part 236 is in connected to the outer resin part 35a and the inner resin part 35e. Although it is not illustrated in the drawings, the first guide part 236 is connected to the upper cover part 35b and the lower cover part 35c.

With such configuration, the entire surface on the driving side (+θZ side) of the permanent magnet 233A is in contact with the first guide part 236. Accordingly, the permanent magnet 233A is retained inside the magnet insertion hole 38 in a more stable manner.

Figure 11:
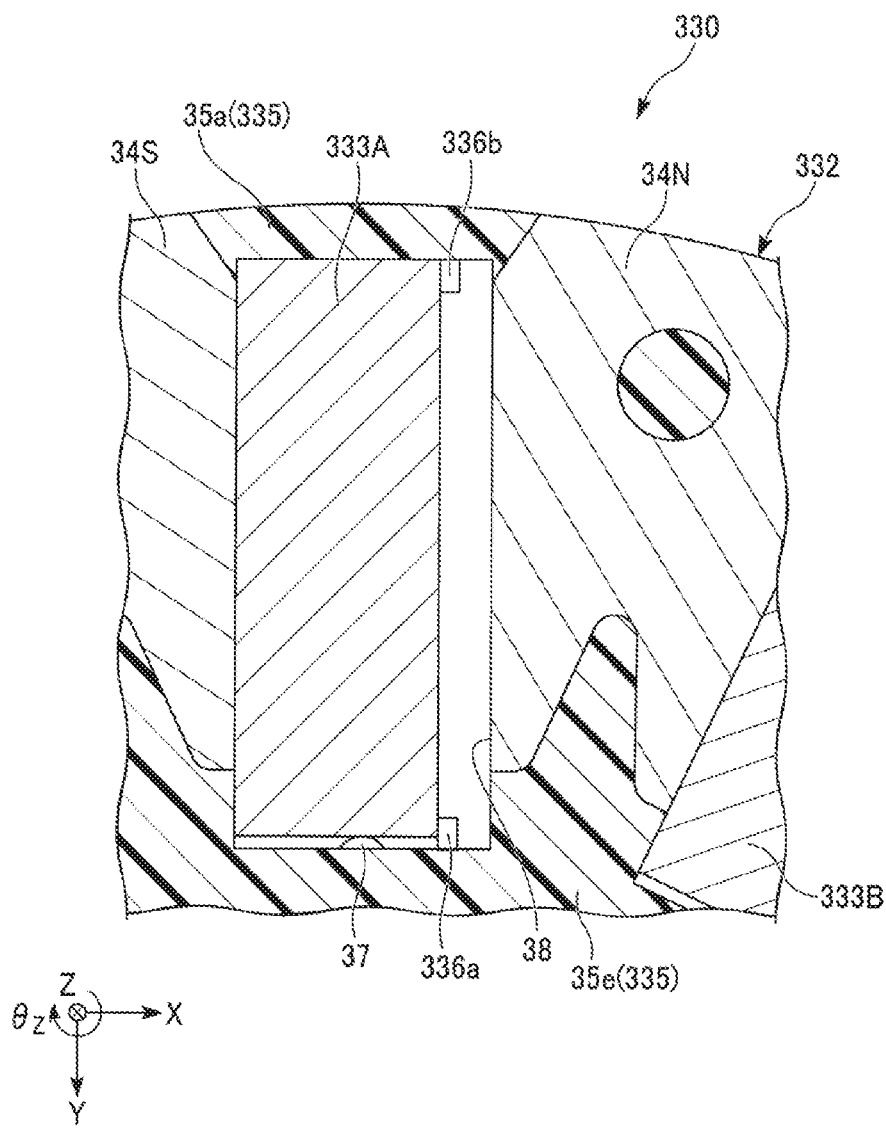
FIG. 11 is a partially enlarged view of another example of the rotor of the first exemplary embodiment.

The present embodiment may configure the first guide part shown in FIG. 11 to be disposed apart from a surface on the driving side (+θZ side) of the magnet insertion hole 38.

FIG. 11 is a cross-sectional view which illustrates a portion of a rotor 330 according to another example of the present embodiment. As shown in FIG. 11, the rotor 330 has a rotor body unit 332. The rotor body unit 332 has permanent magnets 333A, 333B, core piece parts 34N, 34S, and a mold resin part 335. The shape of the permanent magnets 333A, 333B is identical to the permanent magnets 233A, 233B shown in FIG. 10, except that the width in the circumferential direction is a little smaller.

The mold resin part 335 has an inner first guide part 336a, an outer first guide part 336b, and a second guide part 37. The inner first guide part 336a and the outer first guide part 336b are provided inside the magnet insertion hole 38. The inner first guide part 336a and the outer first guide part 336b are disposed at the counter driving side (−θZ side) apart from the driving side (+θZ side) of the magnet insertion hole 38.

The inner first guide part 336a protrudes radially inward from a surface on a radially outer side of the magnet insertion hole 38. The inner first guide part 336a is connected to the outer resin part 35a. The shape of the cross section perpendicular to the axial direction of the inner first guide part 336a is, for example, quadrangular. Although it is not illustrated in the drawings, the inner first guide part 336a is, for example, provided at a portion in the axial direction (Z-axis direction) of the magnet insertion hole 38. A surface on the counter driving side (−θZ side) of the inner first guide part 336a is in contact with the permanent magnet 333A.

The outer first guide part 336b protrudes radially inward from a surface on a radially outer side of the magnet insertion hole 38. The outer first guide part 336b is connected to the inner resin part 35e. Other constitutions of the outer first guide part 336b are identical to those of the inner first guide part 336a. Also as shown in FIG. 11, the outer first guide part 336b faces the inner first guide part 336a in the radial direction.

In the present embodiment, the entire first guide part does not necessarily need to be on the same side as the magnet insertion hole 38. Also, the first guide part may not be provided to some of the magnet insertion holes 38.

The present embodiment may configure at least a portion of the first guide part to be a rib which protrudes inside the magnet insertion hole 38. That is, when a plurality of first guide parts is provided, all of them may be a rib.

The present embodiment may configure the second guide part 37 to cover as least a portion of a surface on a radially inner side of the magnet insertion hole 38. That is, the second guide part 37 may cover the entire surface on a radially inner side of the magnet insertion hole 38.

The present embodiment may configure the second guide part 37 to be disposed at one circumferential side relative to the center of the magnet insertion hole 38 in the radial direction, and cover at least a portion of a surface on one radial side of the magnet insertion hole. That is, the second guide part 37 is disposed at a radially outer side than the center of the magnet insertion hole 38 in the radial direction, and may cover at least a portion of a surface on a radially outer side of the magnet insertion hole.

The present embodiment may also configure the second guide part 37 to be disposed apart from a surface on a radially inner side of the magnet insertion hole 38.

In the present embodiment, the second guide part 37 may not be provided to some of the magnet insertion hole 38, and the second guide part 37 may not be provided to any of the magnet insertion hole 38.

Also in the present embodiment, the magnet insertion hole 38 may pass through the rotor 30 in the axial direction (Z-axis direction).

In the present embodiment, the rotor body unit 32 may be coupled to the shaft 31 through a separate member.

Second Embodiment

The second embodiment is different from the first embodiment in that the core piece parts are connected to each other. The constitutions identical to those of the first embodiment will be referred to with the same reference numbers, and those constitutions may not be explained in detail.

Figure 12:
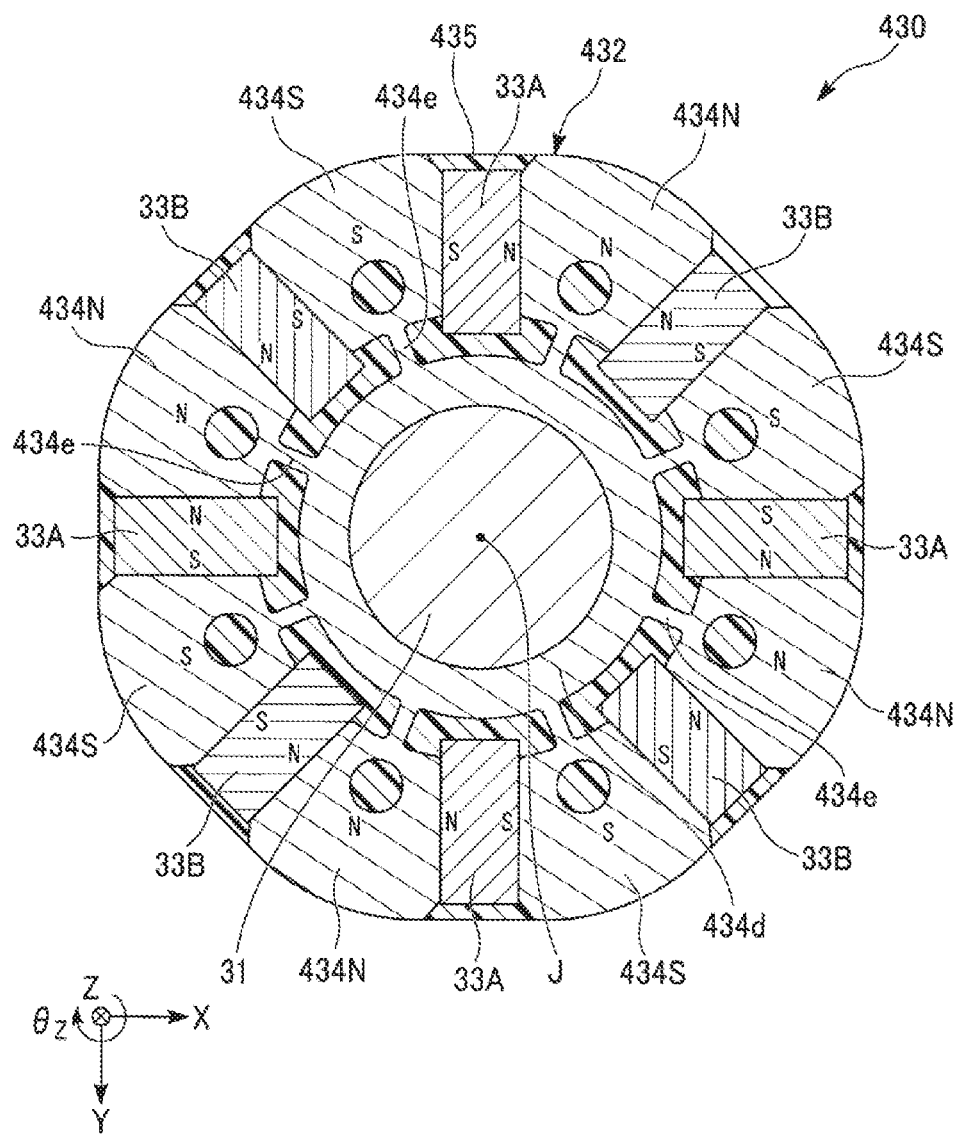
FIG. 12 is a cross-sectional view of a rotor of a second exemplary embodiment.
Figure 13:
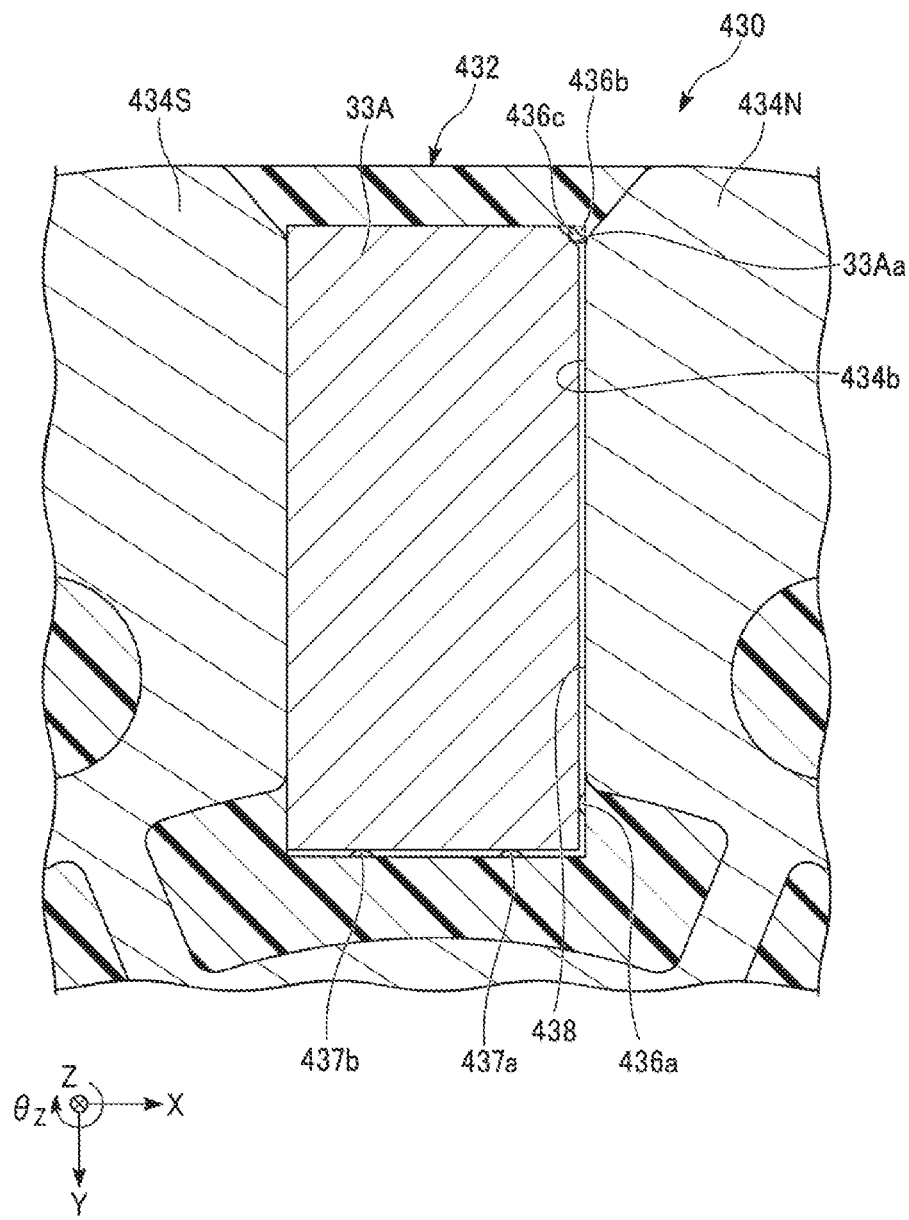
FIG. 13 illustrates the rotor of the second exemplary embodiment, and is a partially enlarged view of FIG. 12.

FIG. 12 is a cross-sectional view of a rotor 430 according to the present embodiment. FIG. 13 is a partially enlarged view of FIG. 12. As shown in FIG. 12, the rotor 430 has a shaft 31 and a rotor body unit 432. The rotor 430 also has a magnet insertion hole 438. The magnet insertion hole 438 is identical to the magnet insertion hole 38 of the first embodiment.

The rotor body unit 432 has a plurality of permanent magnets 33A, 33B, a core annular part 434d, a core piece connector part 434e, a plurality of core piece parts 434N, 434S, and a mold resin part 435.

The core annular part 434d is a portion of an annular shape. The core annular part 434d is, for example, fixed by being fitted into the outer circumferential surface of the shaft 31. The core piece connector part 434e extends radially outward from the core annular part 434d. The core piece connector part 434e is provided in plurality. The plurality of core piece connector parts 434e is for example, provided at equal spaces in the circumferential direction.

A radially outer end portion of the core piece connector part 434e is connected to the core piece parts 434N, 434S, respectively. Accordingly, the core piece parts 434N, 434S are connected to each other via the core piece connector part 434e and the core annular part 434d. For this reason, it is possible to improve the relative positional accuracy between the core piece parts 434N, 434S.

The number of the core piece part 434N provided in the present embodiment is, for example, four. The number of the core piece part 434S is also, for example, four. Accordingly, the number of the permanent magnet 33A provided in the present embodiment is, for example, four. The number of the permanent magnet 33B is also, for example, four. That is, the number of the core piece part 434N is identical to the number of the core piece part 434S, the number of the permanent magnet 33A, and the number of the permanent magnet 33B, respectively. Also, the number of these constitutions may be appropriately altered as long as they are capable of constituting the rotor 30.

Other constitutions of the core piece parts 434N, 434S are identical to those of the core piece parts 34N, 34S of the first embodiment, except for a little difference in their shape.

A portion of the mold resin part 435 is disposed between the neighboring core piece connector parts 434e in the circumferential direction. A portion of the mold resin part 435 connects the core piece parts 434N, 434S, the core piece connector parts 434e, and the core annular part 434d. A part of the mold resin part 435 connects the circumferentially neighboring core piece connector parts 434e in the circumferential direction. Therefore, it is possible to reinforce the core piece connector part 434e by the mold resin portion 435. As a result, the connection between the core annular part 434d and the core piece parts 434N, 434S is strengthened.

The mold resin part 435 has first guide parts 436a, 436b, and second guide parts 436b, 436c. More specifically, the mold resin part 435 has an inner first guide part 436a, outer first guide parts 436b, 436, and second guide parts 437a, 437b, as shown in FIG. 13.

The structure of the inner first guide part 436a is identical to the inner first guide part 63a of the first embodiment. The structure of the outer first guide part 436b is identical to the outer first guide part 36b of the first embodiment, except that it is in contact with the permanent magnet 33A via the outer first guide part 436c.

The outer first guide part 436c is provided on a surface which the outer first guide part 436c faces the permanent magnet 33A. The outer first guide part 436c is a rib which protrudes inside the magnet insertion hole 438. The outer first guide part 436c is disposed at a radially outer side than a counter driving side surface 434b adjacent to the magnet insertion hole 438 of the core piece part 434N. That is, in the present embodiment, the inner first guide part 436a and the outer first guide part 436c, which are ribs, are disposed at a radially inners side or at a radially outer side than the counter driving side surface 434b adjacent to the magnet insertion hole 438 of the core piece part 434N. As a result, it is easy to install the first guide part, which is a rib, to a portion having a relatively greater thickness in the mold resin part 435.

The outer first guide part 436c is in contact with the magnet corner part 33Aa of the permanent magnet 33A. The shape of the outer first guide part 436c, which is a rib, is, for example, identical to the shape of the inner first guide part 36a of the first embodiment, which is also a rib.

The second guide parts 437a, 437b is provided inside the magnet insertion hole 438. That is, at least two second guide parts are provided inside the magnet insertion hole 438. Accordingly, it is easy to adjust the permanent magnet 33A closer to a radially outer side.

The second guide part 437a is disposed closer to the driving side +θZ side) than the center of the magnet insertion hole 438 in the circumferential direction. The second guide part 437b is disposed closer to the counter driving side (−θZ side) than the center of the magnet insertion hole 438 in the circumferential direction. That is, in the present embodiment, at least one second guide part is each provided closer to the driving side than the center of the magnet insertion hole 438 in the circumferential direction, and closer to the counter driving side than the center of the magnet insertion hole 438 in the circumferential direction. As a result, the permanent magnet 33A is retained at a radially inner side in a more stable manner.

The second guide parts 437a, 437b are ribs. Other constitutions of the second guide parts 437a, 437b are identical to those of the second guide part 37 of the first embodiment. Other constitutions of the rotor 430 are identical to those of the rotor 30 of the first embodiment.

The present embodiment may also configure at least one of the second guide parts 437a, 437b to be a rib which protrudes inside the magnet insertion hole 438. That is, for example, only one of the second guide parts 437a, 437b may be a rib.

Further, the purpose of the motor according to the present disclosure is not particularly limited. The motor according to the present disclosure is used, for example, as a motor equipped in a vehicle.

Each constitution of the first embodiment and the second embodiment described above may be appropriately combined as long as they do not contradict each other.

While embodiments of the present invention have been described above, it is to be understood that variations and modifications will be apparent to those skilled in the art without departing from the scope and spirit of the present invention. The scope of the present invention, therefore, is to be determined solely by the following claims.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A motor, comprising:
a rotor comprising a shaft having its center on a vertically extended center axis;
a stator which is disposed at a radially outer side of the rotor; and
a bearing which supports the shaft,
wherein the rotor comprises a plurality of core pieces arranged on a radially outer side of the shaft along a circumferential direction, a plurality of permanent magnets to magnetize the core piece part, and a mold resin part made of resin and disposed between the plurality of core pieces, and an interposed part in contact with a surface on one side in a circumferential direction of each of the core pieces, the neighboring core pieces comprises a magnet insertion hole provided therebetween in a circumferential direction, extended in an axial direction for insertion of at least one the permanent magnets,
at least one of the permanent magnets comprises two magnetic poles arranged along a circumferential direction, the magnetic poles of the circumferentially neighboring permanent magnets facing each other having identical polarity, wherein
each of the permanent magnets is in indirect contact with the core piece positioned on the other side in the circumferential direction of the magnet insertion hole via the interposed part, and
a dimension in the circumferential direction of the interposed part is smaller than a distance in the circumferential direction between a surface on one side in the circumferential direction of at least one of the permanent magnets and the core piece positioned on one side in the circumferential direction of the magnet insertion hole.

2. The motor according to claim 1, wherein
the interposed part is made of a resin.

3. The motor according to claim 1, wherein
the interposed part has a wall shape covering an entire surface on the other side in the circumferential direction of the magnet insertion hole.

4. The motor according to claim 1, wherein
the mold resin part includes:
an outer resin part positioned on a radial outer side of at least one of the permanent magnets; and
an inner resin part positioned on a radial inner side of at least one of the permanent magnets, wherein
the interposed part is connected to the outer resin part and the inner resin part.

5. The motor according to claim 1,
wherein at least one of the permanent magnets is disposed at a position which is on the other side in the circumferential direction away from the core piece positioned on one side in the circumferential direction of the magnet insertion hole and which is on one side in the circumferential direction away from the core piece positioned on the other side in the circumferential direction of the magnet insertion hole.

6. The motor according to claim 1, wherein
the mold resin part includes at least one first guide part provided in the magnet insertion hole, and
the first guide part is positioned on one side in the circumferential direction with respect to a center between the neighboring core pieces in the circumferential direction and covers at least a part of a surface on one side in the circumferential direction of the magnet insertion hole.

7. The motor according to claim 6, wherein
a relation of L1−L2<L3 is satisfied when:
a distance in the circumferential direction between an end part on the other side in the circumferential direction of the first guide part and the core piece positioned on the other side in the circumferential direction of the magnet insertion hole is defined as L1;
a dimension in the circumferential direction of at least one of the permanent magnets is defined as L2; and
a distance in the circumferential direction between the end part on the other side in the circumferential direction of the first guide part and the core piece positioned on one side in the circumferential direction of the magnet insertion hole is defined as L3.

8. The motor according to claim 6, wherein
the first guide part has a wall shape covering an entire surface on one side in the circumferential direction of the magnet insertion hole.

9. The motor according to claim 6,
wherein at least one of the first guide parts is a rib which protrudes inside the magnet insertion hole.

10. The motor according to claim 9,
wherein the rib is disposed at a radially inner side or a radially outer side of a surface adjacent to the magnet insertion hole.

11. The motor according to claim 1,
wherein the mold resin part comprises at least one second guide part provided inside the magnet insertion hole, and
the second guide part is disposed closer to one circumferential direction than the center of the magnet insertion hole in the radial direction, and covers at least a portion of a surface on one radial direction of the magnet insertion hole.

12. The motor according to claim 11,
wherein the second guide part is disposed at a more radially inner side than the center of the magnet insertion hole in the circumferential direction, and covers at least a portion of a surface on a radially inner side of the magnet insertion hole.

13. The motor according to claim 11,
wherein the second guide part is in contact with at least one of the permanent magnets.

14. The motor according to claim 11,
wherein at least two second guide parts are provided inside the magnet insertion hole.

15. The motor according to claim 14,
wherein at least one second guide part is each provided closer to one circumferential direction than the center of the magnet insertion hole in the circumferential direction, and to the other circumferential direction of the magnet insertion hole in the circumferential direction.

16. The motor according to claim 11,
wherein at least one of the second guide parts is a rib which protrudes inside the magnet insertion hole.

17. The motor according to claim 16,
wherein the rib extends in the axial direction, and
the width of the rib increases toward the axially upper side in the protruding direction of the rib.

18. The motor according to claim 16,
wherein the rib extends in the axial direction, and
the width of the rib increases toward the axially upper side in a direction perpendicular to the protruding direction of the rib and to the axial direction.

19. The motor according to claim 16,
wherein the shape of a cross section perpendicular to the extending direction of the rib is semicircular.

20. The motor according to claim 16,
wherein the mold resin part comprises an upper cover part which is disposed at a radially upper side of the core piece part, and
the rib is connected to the cover part.

21. The motor according to claim 1,
wherein among the corner parts on a radially outer side of the core piece part, the corner parts on an other circumferential side are chamfered.

22. The motor according to claim 1,
wherein among the corner parts on a radially outer side of at least one of the permanent magnets, the corner parts on one circumferential side are chamfered.

23. The motor according to claim 1,
wherein a radially inner end portion of the core piece part is disposed at a radially outer side than a radially inner end portion of at least one of the permanent magnets.

24. The motor according to claim 1,
wherein the core piece parts are separated from each other.

25. The motor according to claim 1,
wherein the core piece parts are connected to each other.

26. A motor, comprising:
a rotor comprising a shaft having its center on a vertically extended center axis;
a stator which is disposed at a radially outer side of the rotor; and
a bearing which supports the shaft,
wherein the rotor comprises a plurality of core pieces arranged on a radially outer side of the shaft along a circumferential direction, a plurality of permanent magnets to magnetize the core piece part, and a mold resin part made of resin and disposed between the plurality of core pieces, and an interposed part in contact with a surface on one side in a circumferential direction of each of the core pieces, the neighboring core pieces comprises a magnet insertion hole provided there between in a circumferential direction, extended in an axial direction for insertion of at least one of the permanent magnets,
at least one of the permanent magnets comprises two magnetic poles arranged along a circumferential direction, the magnetic poles of the circumferentially neighboring permanent magnets facing each other having identical polarity, wherein
each of the permanent magnets is in indirect contact with the core piece positioned on the other side in the circumferential direction of the magnet insertion hole via the interposed part, the mold resin part includes at least one first guide part provided in the magnet insertion hole, and
the first guide part is positioned on one side in the circumferential direction with respect to a center between the neighboring core pieces in the circumferential direction and covers at least a part of a surface on one side in the circumferential direction of the magnet insertion hole.

27. The motor according to claim 26, wherein
the interposed part is made of a resin.

28. The motor according to claim 26, wherein
the interposed part has a wall shape covering an entire surface on the other side in the circumferential direction of the magnet insertion hole.

29. The motor according to claim 26, wherein
the mold resin part includes:
an outer resin part positioned on a radial outer side of at least one of the permanent magnets; and
an inner resin part positioned on a radial inner side of at least one of the permanent magnets, wherein
the interposed part is connected to the outer resin part and the inner resin part.

30. The motor according to claim 26,
wherein at least one of the permanent magnets is disposed at a position which is on the other side in the circumferential direction away from the core piece positioned on one side in the circumferential direction of the magnet insertion hole and which is on one side in the circumferential direction away from the core piece positioned on the other side in the circumferential direction of the magnet insertion hole.

31. The motor according to claim 26, wherein
a relation of L1−L2<L3 is satisfied when:
a distance in the circumferential direction between an end part on the other side in the circumferential direction of the first guide part and the core piece positioned on the other side in the circumferential direction of the magnet insertion hole is defined as L1;
a dimension in the circumferential direction of at least one of the permanent magnets is defined as L2; and
a distance in the circumferential direction between the end part on the other side in the circumferential direction of the first guide part and the core piece positioned on one side in the circumferential direction of the magnet insertion hole is defined as L3.

32. The motor according to claim 26, wherein
the first guide part has a wall shape covering an entire surface on one side in the circumferential direction of the magnet insertion hole.

33. The motor according to claim 26,
wherein the mold resin part comprises at least one second guide part provided inside the magnet insertion hole, and
the second guide part is disposed closer to one circumferential direction than the center of the magnet insertion hole in the radial direction, and covers at least a portion of a surface on one radial direction of the magnet insertion hole.

34. The motor according to claim 33,
wherein the second guide part is disposed at a more radially inner side than the center of the magnet insertion hole in the circumferential direction, and covers at least a portion of a surface on a radially inner side of the magnet insertion hole.

35. The motor according to claim 33,
wherein the second guide part is in contact with at least one of the permanent magnets.

36. The motor according to claim 33,
wherein at least two second guide parts are provided inside the magnet insertion hole.

37. The motor according to claim 36,
wherein at least one second guide part is each provided closer to one circumferential direction than the center of the magnet insertion hole in the circumferential direction, and to the other circumferential direction of the magnet insertion hole in the circumferential direction.

38. The motor according to claim 33,
wherein at least one of the second guide parts is a rib which protrudes inside the magnet insertion hole.

39. The motor according to claim 38,
wherein the rib extends in the axial direction, and
the width of the rib increases toward the axially upper side in the protruding direction of the rib.

40. The motor according to claim 38,
wherein the rib extends in the axial direction, and
the width of the rib increases toward the axially upper side in a direction perpendicular to the protruding direction of the rib and to the axial direction.

41. The motor according to claim 38,
wherein the shape of a cross section perpendicular to the extending direction of the rib is semicircular.

42. The motor according to claim 38,
wherein the mold resin part comprises an upper cover part which is disposed at a radially upper side of the core piece part, and
the rib is connected to the cover part.

43. The motor according to claim 26,
wherein at least one of the first guide parts is a rib which protrudes inside the magnet insertion hole.

44. The motor according to claim 43,
wherein the rib is disposed at a radially inner side or a radially outer side of a surface adjacent to the magnet insertion hole.

45. The motor according to claim 26,
wherein among the corner parts on a radially outer side of the core piece part, the corner parts on an other circumferential side are chamfered.

46. The motor according to claim 26,
wherein among the corner parts on a radially outer side of at least one of the permanent magnets, the corner parts on one circumferential side are chamfered.

47. The motor according to claim 26,
wherein a radially inner end portion of the core piece part is disposed at a radially outer side than a radially inner end portion of at least one of the permanent magnets.

48. The motor according to claim 26,
wherein the core piece parts are separated from each other.

49. The motor according to claim 26,
wherein the core piece parts are connected to each other.

50. A motor, comprising:
a rotor comprising a shaft having its center on a vertically extended center axis;
a stator which is disposed at a radially outer side of the rotor; and
a bearing which supports the shaft,
wherein the rotor comprises a plurality of core pieces arranged on a radially outer side of the shaft along a circumferential direction, a plurality of permanent magnets to magnetize the core piece part, and a mold resin part made of resin and disposed between the plurality of core pieces, and an interposed part in contact with a surface on one side in a circumferential direction of each of the core pieces, the neighboring core pieces comprises a magnet insertion hole provided there between in a circumferential direction, extended in an axial direction for insertion of at least one of the permanent magnets,
at least one of the permanent magnets comprises two magnetic poles arranged along a circumferential direction, the magnetic poles of the circumferentially neighboring permanent magnets facing each other having identical polarity, wherein
each of the permanent magnets is in indirect contact with the core piece positioned on the other side in the circumferential direction of the magnet insertion hole via the interposed part,
wherein the mold resin part comprises at least one second guide part provided inside the magnet insertion hole, and
the second guide part is disposed closer to one circumferential direction than the center of the magnet insertion hole in the radial direction, and covers at least a portion of a surface on one radial direction of the magnet insertion hole.

51. The motor according to claim 50, wherein
the interposed part is made of a resin.

52. The motor according to claim 50, wherein
the interposed part has a wall shape covering an entire surface on the other side in the circumferential direction of the magnet insertion hole.

53. The motor according to claim 50, wherein
the mold resin part includes:
an outer resin part positioned on a radial outer side of at least one of the permanent magnets; and
an inner resin part positioned on a radial inner side of at least one of the permanent magnets, wherein
the interposed part is connected to the outer resin part and the inner resin part.

54. The motor according to claim 50,
wherein at least one of the permanent magnets is disposed at a position which is on the other side in the circumferential direction away from the core piece positioned on one side in the circumferential direction of the magnet insertion hole and which is on one side in the circumferential direction away from the core piece positioned on the other side in the circumferential direction of the magnet insertion hole.

55. The motor according to claim 50,
wherein the second guide part is disposed at a more radially inner side than the center of the magnet insertion hole in the circumferential direction, and covers at least a portion of a surface on a radially inner side of the magnet insertion hole.

56. The motor according to claim 50,
wherein the second guide part is in contact with at least one of the permanent magnets.

57. The motor according to claim 50,
wherein at least two second guide parts are provided inside the magnet insertion hole.

58. The motor according to claim 57,
wherein at least one second guide part is each provided closer to one circumferential direction than the center of the magnet insertion hole in the circumferential direction, and to the other circumferential direction of the magnet insertion hole in the circumferential direction.

59. The motor according to claim 50,
wherein at least one of the second guide parts is a rib which protrudes inside the magnet insertion hole.

60. The motor according to claim 59,
wherein the rib extends in the axial direction, and
the width of the rib increases toward the axially upper side in the protruding direction of the rib.

61. The motor according to claim 59,
wherein the rib extends in the axial direction, and
the width of the rib increases toward the axially upper side in a direction perpendicular to the protruding direction of the rib and to the axial direction.

62. The motor according to claim 59,
wherein the shape of a cross section perpendicular to the extending direction of the rib is semicircular.

63. The motor according to claim 59,
wherein the mold resin part comprises an upper cover part which is disposed at a radially upper side of the core piece part, and
the rib is connected to the cover part.

64. The motor according to claim 50,
wherein among the corner parts on a radially outer side of the core piece part, the corner parts on an other circumferential side are chamfered.

65. The motor according to claim 50,
wherein among the corner parts on a radially outer side of at least one of the permanent magnets, the corner parts on one circumferential side are chamfered.

66. The motor according to claim 50,
wherein a radially inner end portion of the core piece part is disposed at a radially outer side than a radially inner end portion of at least one of the permanent magnets.

67. The motor according to claim 50,
wherein the core piece parts are separated from each other.

68. The motor according to claim 50,
wherein the core piece parts are connected to each other.

* * * * *